(12) United States Patent
Casagrande

(10) Patent No.: US 10,801,665 B2
(45) Date of Patent: *Oct. 13, 2020

(54) MOUNTING SYSTEM AND ACCESSORY COMPONENTS

(71) Applicant: Charles L. Casagrande, Bradenton, FL (US)

(72) Inventor: Charles L. Casagrande, Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,257

(22) Filed: Apr. 18, 2019

(65) Prior Publication Data

US 2019/0242521 A1  Aug. 8, 2019

Related U.S. Application Data

(63) Continuation of application No. 14/873,081, filed on Oct. 1, 2015, now Pat. No. 10,267,453, which is a continuation-in-part of application No. 13/944,179, filed on Jul. 17, 2013, now abandoned, which is a continuation of application No. 11/713,569, filed on Mar. 2, 2007, now abandoned.

(60) Provisional application No. 60/899,202, filed on Feb. 2, 2007, provisional application No. 60/779,195, filed on Mar. 3, 2006.

(51) Int. Cl.
| | |
|---|---|
| *F16B 47/00* | (2006.01) |
| *F16M 13/02* | (2006.01) |
| *F16M 11/04* | (2006.01) |
| *F16M 11/20* | (2006.01) |
| *F16M 13/00* | (2006.01) |
| *F16M 11/14* | (2006.01) |
| *A01K 97/06* | (2006.01) |
| *A01K 97/08* | (2006.01) |
| *A01K 97/10* | (2006.01) |

(52) U.S. Cl.
CPC .......... *F16M 13/022* (2013.01); *A01K 97/06* (2013.01); *A01K 97/08* (2013.01); *A01K 97/10* (2013.01); *F16B 47/00* (2013.01); *F16M 11/041* (2013.01); *F16M 11/14* (2013.01); *F16M 11/2078* (2013.01); *F16M 13/00* (2013.01)

(58) Field of Classification Search
CPC .............................. F16B 47/00; B25B 11/005
USPC ............ 248/311.2, 683, 205.5, 205.6, 205.7, 248/205.8, 205.9, 206.2
See application file for complete search history.

(56) References Cited

U.S. PATENT DOCUMENTS 2,420,811 A  5/1947 Sol
2,558,479 A  6/1951 Miller
(Continued)

OTHER PUBLICATIONS

Wood's Power Grip "How They Work" from website http://www.focus.ti.com/vf/docs/blockdiagram.tsp.
(Continued)

*Primary Examiner* — Terrell L McKinnon
*Assistant Examiner* — Michael McDuffie
(74) *Attorney, Agent, or Firm* — Valauskas Corder LLC

(57) ABSTRACT

A mounting system for attaching components, or accessories, to surfaces without compromising, but instead maintaining, the integrity of the mounting surface. The mounting system is easily movable, can withstand or support heavy loads, does not require permanent alteration of the mounting surface by drilling holes or tapping screws and does not require hardware to be affixed to the surface.

7 Claims, 38 Drawing Sheets

(56) References Cited

U.S. PATENT DOCUMENTS

| | | | |
|---|---|---|---|
| 2,565,793 A * | 8/1951 | Weismantel | A47G 29/093 220/630 |
| 2,940,720 A | 6/1960 | Birr | |
| 3,240,525 A | 3/1966 | Wood | |
| 3,593,983 A | 7/1971 | Csenyi | |
| 4,102,609 A | 6/1978 | Wood | |
| 4,196,882 A | 4/1980 | Rognon | |
| 4,397,491 A | 8/1983 | Anderson | |
| 4,681,520 A | 7/1987 | Birkhauser, III | |
| 4,756,497 A * | 7/1988 | Lan | A47G 23/03 220/630 |
| 4,815,395 A | 3/1989 | Trueg | |
| 4,941,635 A * | 7/1990 | Lan | A47G 23/03 248/205.9 |
| 5,184,858 A | 2/1993 | Arai | |
| 5,222,707 A | 6/1993 | Myers | |
| 5,292,045 A | 3/1994 | Mandel | |
| 5,381,990 A | 1/1995 | Belokin et al. | |
| 5,398,602 A | 3/1995 | Taylor | |
| 5,435,511 A * | 7/1995 | Hsu | A01K 63/006 248/206.3 |
| 5,639,134 A * | 6/1997 | Rusch | B25B 11/007 294/187 |
| 5,715,876 A | 2/1998 | Burt | |
| 5,772,823 A | 6/1998 | Rusch | |
| 5,845,885 A | 12/1998 | Carnevali | |
| D403,563 S | 1/1999 | Thomas | |
| D406,029 S | 2/1999 | Thomas | |
| 5,938,083 A * | 8/1999 | Quinn | A61M 11/06 222/184 |
| 5,952,012 A | 9/1999 | Thomas | |
| 6,000,575 A * | 12/1999 | LaCour | A47G 23/0225 220/739 |
| 6,139,300 A | 10/2000 | Thomas | |
| 6,318,689 B1 * | 11/2001 | Rodriguez | A47G 23/0225 248/205.5 |
| 6,497,394 B1 * | 12/2002 | Dunchock | A47G 23/0225 248/205.8 |
| 6,596,374 B1 * | 7/2003 | Adjeleian | B60N 3/103 206/490 |
| 6,666,420 B1 | 12/2003 | Carnevali | |
| 6,827,344 B1 | 12/2004 | Ristau | |
| 6,827,396 B1 | 12/2004 | Jewell | |
| 7,028,962 B1 | 4/2006 | Hostetler | |
| 7,673,914 B2 * | 3/2010 | Liao | F16B 47/00 116/70 |
| 7,997,554 B2 * | 8/2011 | Carnevali | F16B 47/00 248/346.2 |
| 8,033,517 B2 * | 10/2011 | Wilcoxon | A47G 19/2261 248/205.8 |
| 8,757,418 B2 * | 6/2014 | Zimmerman | A47G 7/06 220/483 |
| 8,967,562 B1 * | 3/2015 | Bileth | F16M 13/022 220/23.2 |
| 10,267,453 B2 * | 4/2019 | Casagrande | F16M 11/14 |
| 2002/0139911 A1 * | 10/2002 | Immerman | F16B 47/00 248/206.3 |
| 2003/0107227 A1 * | 6/2003 | Nagler | B25J 15/0616 294/188 |
| 2004/0084593 A1 * | 5/2004 | Barfield | A47G 23/0225 248/311.2 |
| 2004/0178315 A1 | 9/2004 | Lee | |
| 2004/0262481 A1 * | 12/2004 | Carnevali | B60N 3/103 248/311.2 |
| 2006/0091276 A1 * | 5/2006 | Ward | B60N 3/103 248/311.2 |
| 2007/0221801 A1 * | 9/2007 | Jensen | F16B 45/00 248/206.2 |
| 2007/0221806 A1 * | 9/2007 | Mehta | A47G 23/0241 248/311.2 |
| 2008/0173600 A1 * | 7/2008 | Mungal | A47G 23/02 211/71.01 |
| 2008/0197255 A1 * | 8/2008 | Bergevin | A47G 7/044 248/274.1 |
| 2008/0257226 A1 * | 10/2008 | Schneider | A47F 5/0043 108/27 |
| 2011/0108593 A1 * | 5/2011 | Caldwell | B60N 3/103 224/545 |
| 2011/0220767 A1 * | 9/2011 | Stewart | A47G 19/00 248/121 |
| 2014/0027588 A1 * | 1/2014 | Chen | F16B 47/00 248/205.3 |
| 2014/0054338 A1 * | 2/2014 | Casagrande | B60R 11/02 224/275 |
| 2014/0374552 A1 * | 12/2014 | Zhong | F16B 47/00 248/205.5 |
| 2016/0338517 A1 * | 11/2016 | Snowden | A47G 23/0641 |

OTHER PUBLICATIONS

Wood's Power Grip "About Vacuum" from website http://www.focus.ti.com/vf/docs/blockdiagram.tsp.

Wood's Power Grip "History" from website http://www.powrgrip.com/.

Wood's Power Grip "4-1/2" Concave Vacuum Cup with Threated Hole" from website http://powrgrip.com/.

Wood's Power Grip "6" Vacuum Cups with Flip Handle" from website http://www.powrgrip.com/.

* cited by examiner

MOUNTING SYSTEM AND ACCESSORY COMPONENTS

This is a continuation application of U.S. patent application Ser. No. 14/873,081 filed Oct. 1, 2015, which is a continuation-in-part application of U.S. patent application Ser. No. 13/944,179 filed Jul. 17, 2013, which is a continuation application of U.S. patent application Ser. No. 11/713,569 filed Mar. 2, 2007, now abandoned, which claims priority to both Provisional U.S. Patent Application Ser. No. 60/899,202 filed Feb. 2, 2007, and Provisional U.S. Patent Application Ser. No. 60/779,195 filed Mar. 3, 2006.

FIELD OF THE INVENTION

The invention relates generally to a mounting system, and further a mounting system by which components may be attached to surfaces. More particularly, the invention is directed to a system by which components may be attached to surfaces without compromising, but instead maintaining the integrity of a mounting surface.

The invention is useful in mounting components in a variety of contexts and environments including surfaces of water vessels, vehicles, aircrafts and residential and commercial structures.

BACKGROUND OF THE INVENTION

For purposes of this application, the invention is discussed in reference to mounting components, otherwise referred to herein as accessories, to the surface of water vessels, but the discussion with respect to surfaces of water vessels is merely exemplary. The invention is applicable to attaching any component to any surface, for example, surfaces of a trailer, automobile, aircraft, recreational vehicle, snowboard, residential and commercial structures, or even a wall, cabinet, refrigerator, and shower to name a few.

There are a variety of accessories used on water vessels. Water vessels include, for example, power boat, yacht, caravel, pontoon, rowboat, canoe, sailboat, jet ski dredge, catamaran, ferry, submarine, and tugboat, to name a few.

Types of accessories used on water vessels include electronic, recreational, and craft. Electronic accessories include digital devices, portable devices, such as audio players, vhf and satellite radio, global positioning system (GPS), fish and depth finders, camera and video mounts, safety items such as Emergency Position Indicating Radio Beacon (EPIRB), and personal GPS, radar, etc. Recreational accessories include dive tank, fishing rod and reel, tackle box, spear gun, tow bar, ice chest, fillet table, cutting board, trolling motor, gimbal mounts, etc. Craft accessories include boarding ladder, handle, clips, sea chair, light, bumper, buoy, marker buoy, eyelet, carabineer, cleat, handle, clamps and straps, which can be used to hold gaffs, nets and other poles, for example.

Accessories, or components, are attached to the vessel, typically using adhesives or hardware such as screws, nails, rivets, or bolts that require drilling holes in the vessel to allow for secure attachment of accessories. This disrupts the surface of the vessel. With the loss of the surface integrity, the surface can be weakened.

A demand therefore exists for a mounting system that is easily movable, can withstand or support heavy loads, does not require permanent alteration of the mounting surface by using adhesives, drilling holes or tapping screws and does not require hardware to be affixed to the surface. As an example, with respect to a marine environment, a demand exists for a mounting system for water vessel accessories that does not compromise, but maintains the integrity of a water vessel surface. The invention satisfies these demands.

SUMMARY OF THE INVENTION

The mounting system of the invention allow components to be removeably attached as needed to surfaces without compromising, but instead maintaining, the integrity of the mounting surface. The invention allows components, otherwise referred to herein as accessories, to be attached to a surface.

Again, the invention is discussed herein in reference to mounting components to any surface of a water vessel, for example deck, coach-roof, sole, deck head, bulkhead, bow, stern, starboard, port, hull, keel, transom, cabin trunk, console, cockpit, etc, but it is contemplated that the invention is applicable to attaching any component to any surface, such as those mentioned (as well as not mentioned) above. The terms accessory and support element are used interchangeably herein and refer to components attachable to a mounting system.

The mounting system includes a vacuum device (including a vacuum pad with a vacuum pump) and a housing. The mounting system can be mounted horizontally or vertically on a surface, or anywhere in between. The mounting system is quickly and easily attachable and detachable to mounting surfaces including surfaces underwater.

A vacuum device according to the invention includes a vacuum pad and vacuum pump, although certain embodiments may include a vacuum device without the requirement for a vacuum pump. For example, the invention may include a vacuum pad that is manually installed without the use of a pump.

According to the invention, the vacuum pad can be of any type such as standard suction cup, lever cup, snap hook cup or vacuum cup, and can be of any shape, for example, cup or shield and can further be of any size.

The vacuum pump acts as a check valve and further allows the vacuum device to be re-pumped without loss of remaining vacuum. It is also an object of the invention to include an automatic pump to monitor the vacuum level of the vacuum device. The automatic pump acts as a regulator such that it turns on to increase the vacuum level of the device if the vacuum falls below a pre-determined level.

According to one embodiment, a housing is connected to the vacuum device using one or more attachment elements. The attachment elements are position on the housing and used to fasten or attach components together. Examples of attachment elements include, for example, a hole, slot, pocket, protrusion, aperture, opening and receptacle. It is further contemplated that the attachment elements can be configured for a universal connection for rapid attachment and detachment of components, for example, snap-fit connection, quick-connection and twist-and-lock connection. More specifically, hardware is used with the attachment elements to secure accessories to the housing. Hardware includes, for example, any fastener, adhesive, housing, hardware, clamp, clasp, clip, pin, peg, snap-fit projections, hook-and-loop fastener, and twist-and-lock nodules.

The attachment elements allow for various mounting system configurations. Certain embodiments include a plurality of attachment elements. For example, attachment elements can be connected to one another via hardware, and additionally allow for more surface area to attach components and/or other elements according to the invention.

In addition one or more support elements may be used. A support element may refer to an accessory or component used to assist with securing the accessories to the housing. A support element, for example, may be a buttress, bracket, rope, plate, rod, can be of any size and/or shape to accept another support element such as an accessory. For example, support elements can be connected to one another, and additionally allow for more surface area to attach components and/or mounting systems. The support element allows for various mounting system configurations. In addition, support elements may assist to stabilize and/or distribute the load of the component, thereby alleviating stress on the mounting system and mitigating separation of the vacuum pad from the mounting surface. In certain embodiments of the invention, an accessory attachable to the housing is referred to herein as a support element.

The support element may further include a connecting element. The connecting element can be any size, shape, dimension or configuration. Examples of connecting elements include, for example, apertures, slots, openings and receptacles. It is also contemplated that connecting elements can include fastener, adhesive, hardware, clamp, clasp, clip, pin, peg, protrusions, snap-fit projections, hook-and-loop fastener, and twist-and-lock nodules.

Accordingly, it will be recognized that an object of the invention is to provide a mounting system that is of simple construction and design and can be easily employed with highly reliable results.

It is an object of the invention to provide a mounting system that allows the safe and secure attachment of a variety of components to mounting surfaces. The invention provides a mounting system to attach components to surfaces without altering, or compromising, the mounting surface, for example by the use of adhesives or hardware, i.e., no residue, no drilling holes or tapping screws into the surface.

It is another object of the invention to provide a mounting system that allows an accessory to be quickly and easily attached and detached to any surface. The component is removeably attached to the system and may include a universal connection for rapid attachment and detachment of the component.

Current mounting systems including lever devices are manufactured from metal such that they undergo corrosion and drip rust under environmental elements. It is another object of the invention to provide a mounting system that is durable wherein any part thereof is manufactured from marine grade stainless steel, powder-coated aluminum, rubber or plastic to withstand environmental elements, for example, saltwater, freshwater, extreme temperatures, rough seas to name a few.

It is another object of the invention to provide a mounting system that withstands heavy loads. Depending on the size of the vacuum pad, the invention can support loads of two hundred pounds or more and multiple times that amount underwater. For example, the mounting system of the invention can be used with an underwater lift bag, which is a non-porous bag a diver inflates with air from a dive tank to lift sunken boats and other items from the sea floor.

Yet another object of the invention is to provide a mounting system that can adhere not only to smooth mounting surfaces, but also some non-skid or rough mounting surfaces. The invention can adhere to some non-skid surfaces, for example, with the use of a water-based gel that has the viscosity to fill dips, valleys, gaps, or irregularities between the vacuum device and rough surface.

Typically, vacuum pads of vacuum devices are made from a black rubber material, which easily marks or scuffs a mounting surface. It is an object of the invention to provide a non-marking mounting system such that the vacuum pad does not mark or scuff the mounting surface. For example, a pad made from white or grey rubber material alleviates marks or scuffs on the mounting surface.

It is another object of the invention to provide a pad that maintains the vacuum between the pad and the mounting surface. A pad made from a light colored material such as white or grey rubber minimizes the expansion a black rubber pad may experience in extreme heat and likewise the air and gases between the pad and mounting surface.

Another object of the invention is to provide a mounting system that can be operated by remote control.

Another object of the invention is to provide a mounting system that can be assembled from readily available parts such that the mounting system accommodates various sizes and dimensions of accessories.

Another object of the invention is to provide a mounting system wherein any part thereof is made from a reflective material, iridescent material or a glow-in-the-dark material.

Examples of components that can be attached to a water vessel mounting surface with the mounting system of the invention include electronic, recreational, and craft accessories, for example, tackle box, lights, dive tanks, tarp, beverage, radar, portable electronic device, gimbal mount, marker buoy, cleat, rod holder. It is also contemplated that other components such as pegboard fittings such as hooks, shelf bars, tool holders, label holders, and racks can be attached to a water vessel mounting surface with the mounting system of the invention.

The invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to limit the invention, where like designations denote like elements, and in which.

DETAILED DESCRIPTION OF EMBODIMENTS OF THE INVENTION

The invention is directed to a mounting system is quickly and easily attachable and detachable to mounting surfaces. A mounting system includes a vacuum device and a housing with one or more attachment apertures for connecting accessories, or components. A mounting system may further include one or more other elements such as a support element that assists with securing accessories to the housing; however, it should be noted that a support element may be an accessory according to certain embodiment of the invention. By attaching accessories to the attachment apertures of the housing, the surface to which the mounting system is attached remains free from destruction that may be caused by adhesives or hardware such as screws, nails, rivets, or bolts that require drilling holes. Thus, the mounting system maintains the integrity of a mounting surface.

Figure 1A:
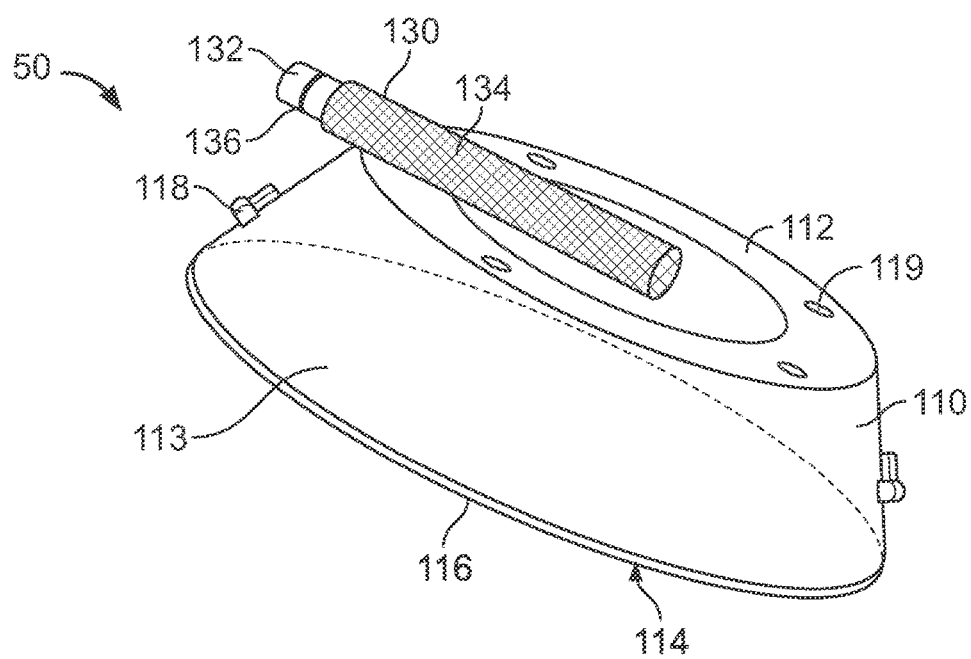
FIG. 1A illustrates a vacuum device according to the invention.

FIG. 1A illustrates a vacuum device 50 of a mounting system 100 according to the invention. The vacuum device 50 includes a vacuum pad 110 and vacuum pump 130, although it is contemplated that a vacuum device 50 of certain embodiments may include only the vacuum pad 110.

Pad 110 includes a top face 112, a side face 113, and a vacuum face 114. Side face 113 meets vacuum face 114 at edge 116. Vacuum face 114 along with edge 116 forms a vacuum seal with a mounting surface. The top face 112 includes one or more connection elements 119 for fastening with housing 200 discussed more fully below.

Side face 113 includes release tabs 118 that assist in removing the pad 110 from the surface. In one embodiment, the tabs 118 are t-shaped ribs that assist in removing the pad 110 as well as add rigidity. For example, in environmental conditions such as warmer temperatures the tabs 118 do not become flexible and prevent release of the vacuum device 50. Pad 110 can be any color and material, although a color and material that does not scuff the mounting surface is preferable. The pad 110 can be a reflective or glow-in-the-dark material so that it can be seen in environmental conditions such as dark atmospheres, for example, under water.

The pump 130 includes a plunger 132, cylinder 134, and an indicator 136. Plunger 132 of pump 130 is positioned within the cylinder 134 and placed on the top face 112 of pad 110. The indicator 136 on plunger 132 conveys the securement level of the attachment between the pad 110 and mounting surface. The indicator 136 can be red, yellow or any color that is easily seen. Additionally, the indicator 136 can be a reflective or glow-in-the-dark material so that it can be seen in environmental conditions such as dark atmospheres such as under water.

Figure 1B:
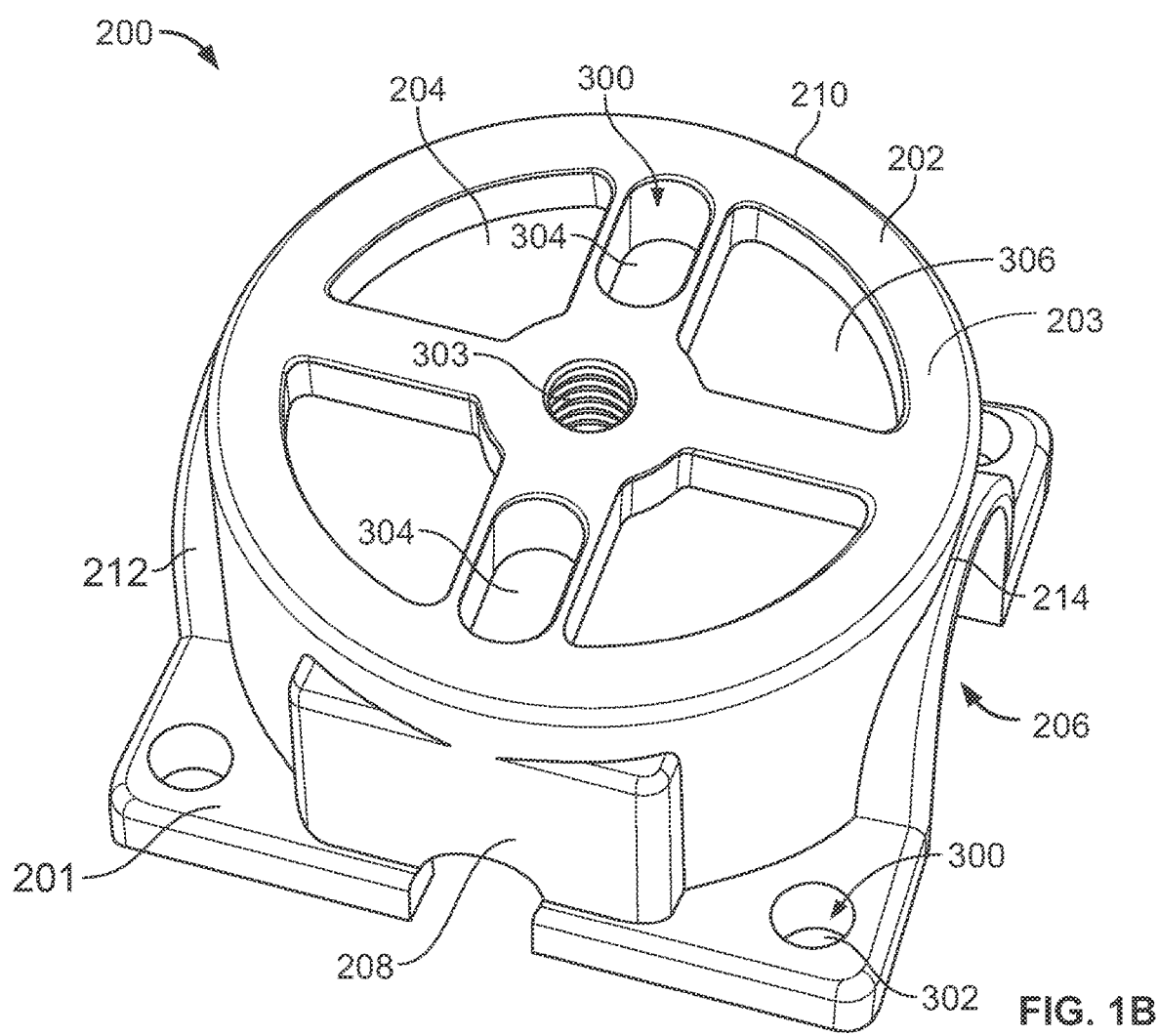
FIG. 1B illustrates a housing according to the invention.

FIG. 1B illustrates a housing 200 of a mounting system 100 according to the invention. Housing 200 can be of any shape, size, configuration and made from any material such as high grade stainless steel, powder-coated aluminum, rubber or plastic. As shown, housing 200 is in the form of a square-shaped housing element 202 defined by a square-shaped base portion 201 and a circular-shaped top portion 203. The square-shaped housing element 202 includes a top side 204, bottom side 206, first side 208, second side 210, third side 212, and pump side 214. It is contemplated that housing 200 can be of any size and/or shape and positioned anywhere to accommodate integration of the pad 110 with pump 130 of the vacuum device 50 while allowing for the attachment of an accessory to the housing 200.

As shown in FIG. 1B, housing 200 includes attachment elements 300 on the square-shaped base portion 201 and circular-shaped top portion 203. Specifically, attachment elements 300 are located on top side 204 of housing 200, but it is contemplated that attachment elements 300 can be located on any side 206, 208, 210, 212, 214 of the housing 202. The attachment elements 300 can be holes, slots, grooves, pockets or any other configuration to accommodate different dimensions of various components, or accessories. Accessories can be directly attached to the housing 200 using attachment elements 300 through the use of hardware. For purposes of this application, hardware includes any device or fastener for example, screws, bolts, nuts, nails, rivets, adhesive, etc., as well as hook-and-loop fastener such as Velcro® or interference fit such as snap-fit.

More specifically, attachment elements 300 include one or more housing aperture 302, hole 303, slot 304, and pocket 306. Housing aperture 302 forms part of the square-shaped base portion 201 and is used to integrate the housing 200 and vacuum device 50. Hole 303, slot 304, and pocket 306 form part of the circular-shaped top portion 203. Hole 303 includes a threaded surface such as that shown in the center of housing 200. As an example, an accessory may include a male threaded portion (i.e., screw) that mates with the threaded hole 303. Slot 304 includes a non-threaded surface. As shown in FIG. 1B, two slots 304 are located on the top side 204 of housing 200 on either side of threaded hole 303. As an example, an accessory may include a portion that may be connected to the slot 304 of housing 200 using bolts or screws, to name a few. Pocket 306 includes a recessed portion allowing portions of an accessory to be positioned below the surface of the top side 204 of housing 200. Attachment elements 300 allow components such as a cleat, a cup, a paddle holder, a tackle box, a marker buoy, a radar and portable electronic device to name a few, to be directly attached to the housing 200.

Figure 1C:
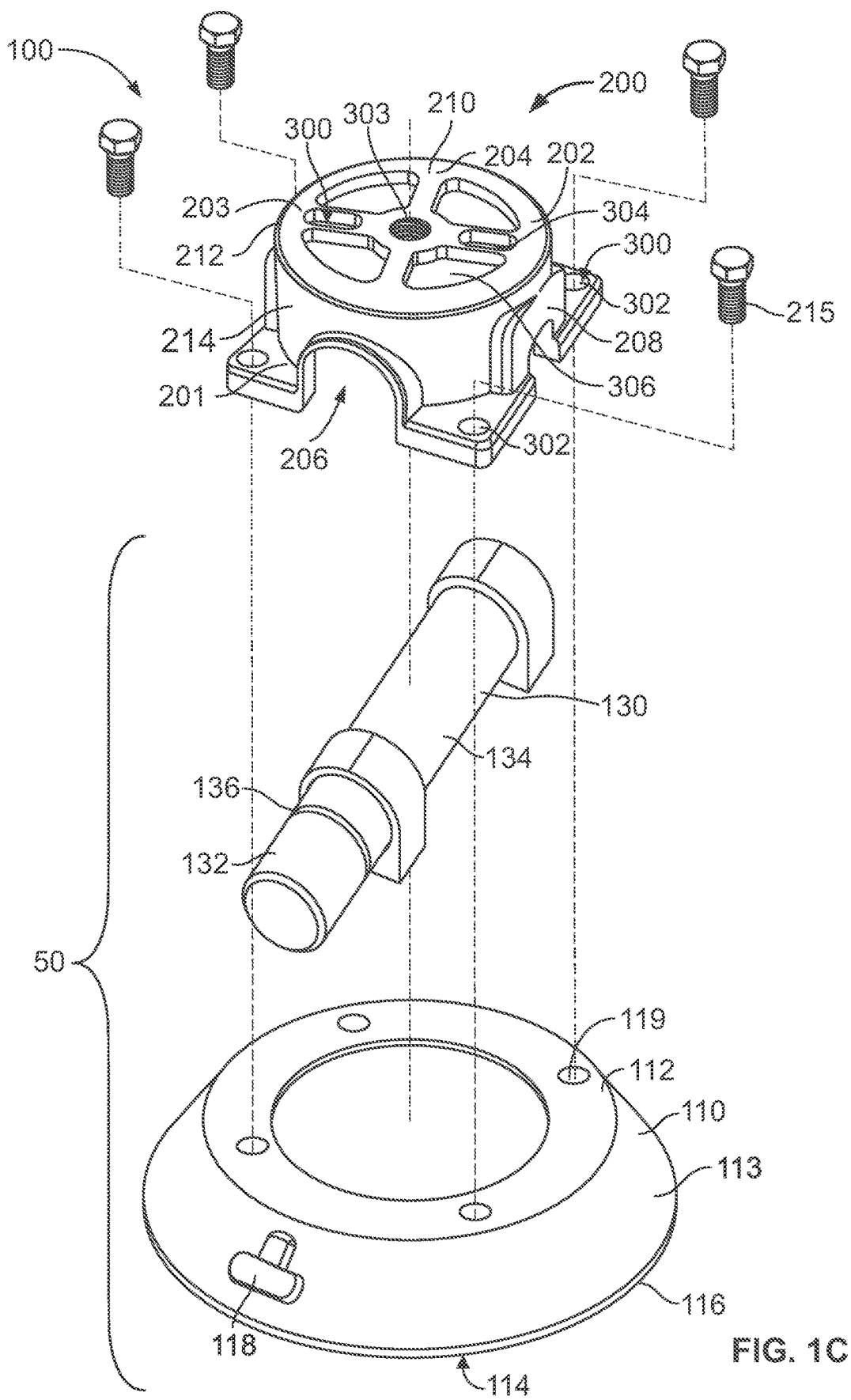
FIG. 1C illustrates an exploded view of a mounting system according to the invention.

FIG. 1C illustrates an exploded view of a mounting system 100. Mounting system 100 comprises a vacuum device 50, including pad 110 and pump 130, and at least one housing 200. The pump 130 is positioned onto the top face 112 of pad 110. As shown, a housing 200, more specifically square-shaped housing 202, is positioned such that the bottom side 206 is placed over the pump 130 and secured to the connection elements 119 via housing apertures 302 of the square-shaped base portion 201. As shown in FIG. 1C hardware 215 engages with housing apertures 302 and connection elements 119 of pad 110 to secure the pad 110 and pump 130. More specifically, housing 200 is integrated with the vacuum device 50.

Figure 2A:
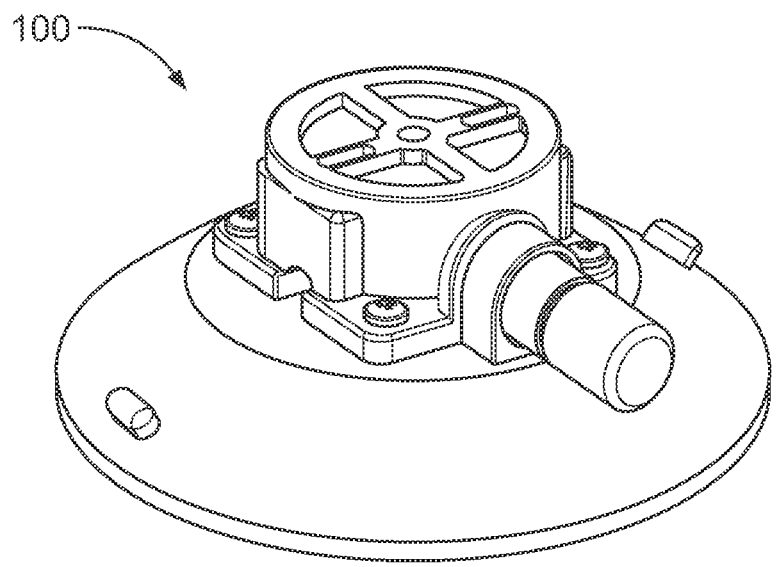
FIG. 2A illustrates an assembled view of the mounting system according to the invention.

FIG. 2A illustrates an assembled view of the mounting system according to the invention. As assembled, vacuum face 114 of pad 110 grips, or adheres, to a mounting surface while housing 200 connects to an accessory. It is also contemplated that the vacuum face 114 may grip or adhere to an accessory. The plunger 132 is pushed into the cylinder 134 such that air, gas, and water are removed from between the vacuum face 114 of the pad 110 and mounting surface. This creates a vacuum such that edge 116 and vacuum face 114 of pad 110 grips the surface. A vacuum is a space from which all matter including air and any gas, is totally removed. A vacuum exists whenever the pressure within the space is less than the pressure that surrounds it.

The indicator 136 on plunger 132 conveys the securement level of the attachment between the pad 110 and mounting surface. When vacuum device 50 is securely attached, the plunger 132 stops moving within the cylinder 134 and the indicator 136 is hidden within cylinder 134. If the indicator 136 is visible, or positioned outside cylinder 134, the vacuum between the pad 110 and mounting surface may be insufficient for the load of the accessory, which may mean the pad 110 is separating from the surface.

To release the vacuum and remove the vacuum device 50, release tabs 118 on the top face 112 of pad 110 are lifted away from the mounting surface. In other embodiments, a valve stem can be activated to release the vacuum device. Additionally, a twist button with a course thread located on the top face 112 of the pad 110 can be used to release the vacuum device 50.

Figure 2B:
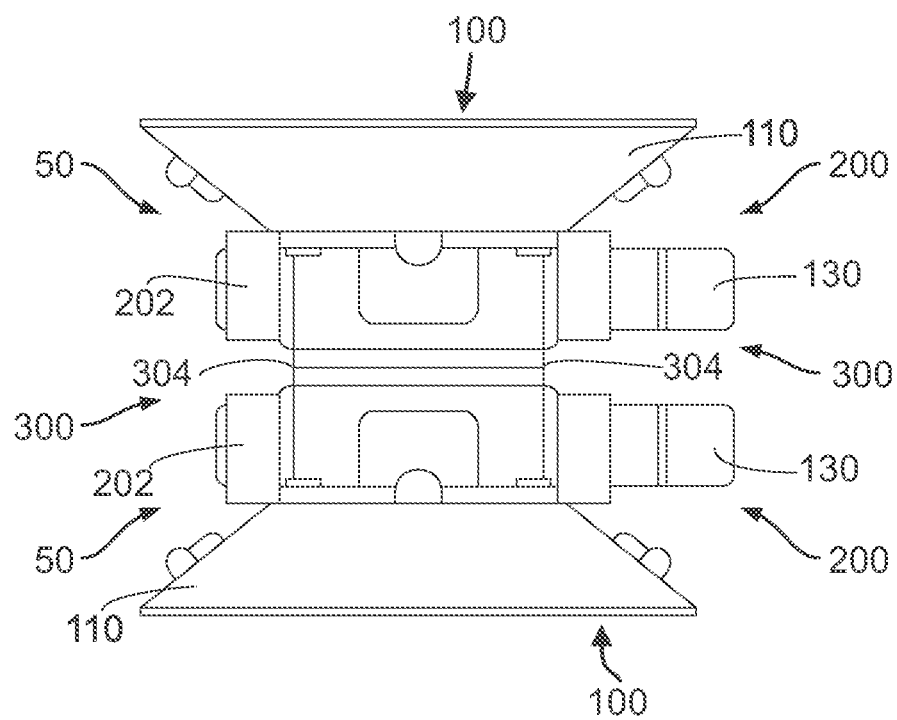
FIG. 2B illustrates two assemblies as shown in FIG. 2A in a back-to-back configuration according to the invention.

Two or more mounting systems 100 can be assembled together using one or more housings 200. More specifically, it is contemplated that two or more housings 200 can be connected to one another via attachment elements 300, allowing for various configurations. For example, hole 303 and/or slot 304 on top face 112 of housing 202 allow for two or more mounting systems 100 to be assembled onto one another, such as side-to-side, back-to-back as shown in FIG. 2B, or stacked as shown in FIG. 3Q. For example, a back-to-back configuration can be used with a fillet table, grill or cooler with a vacuum face 114 of a first mounting system 100 adhered to a mounting surface and a vacuum face 114 of a second mounting system 100 adhered to a component or other element of the invention.

Certain other embodiments of the invention include one or more support elements 400. The support element 400 can be connected to the vacuum device 50 or housing 200, and more specifically to mounting system 100. Support element 400 can be of any shape, size, configuration and made from any material. The support element 400 can bear the load of the accessory, or other element, alleviating stress on the vacuum device 50 and/or can allow for various mounting system configurations. Support elements 400 also assist in preventing the vacuum pad 110 from separating from the mounting surface.

Certain embodiments of the invention may include at least one support element 400 that can be connected to the mounting system 100. As mentioned above, it is also contemplated that certain embodiments may include a vacuum device 50 without the requirement for a vacuum pump 130. For example, the invention may include a vacuum pad 110 and one or more support elements 400. The support element 400 may assist the vacuum pad 110 in maintaining a vacuum with the mounting surface. Components, or other elements, can then be attached directly to the support element 400.

Support elements 400 can further be connected to one another, allowing for more area to attach components. Additionally, a support element 400 may further include one or more connecting elements 500. Connecting elements 500 allow attachment of one or more support elements 400 to other support elements 400, vacuum devices 50, mounting systems 100, housings 200 and/or components. As an example, a support element 400 can include connecting elements 500 down a side wall to allow for vertical attachment of another support element 400.

Figure 3A:
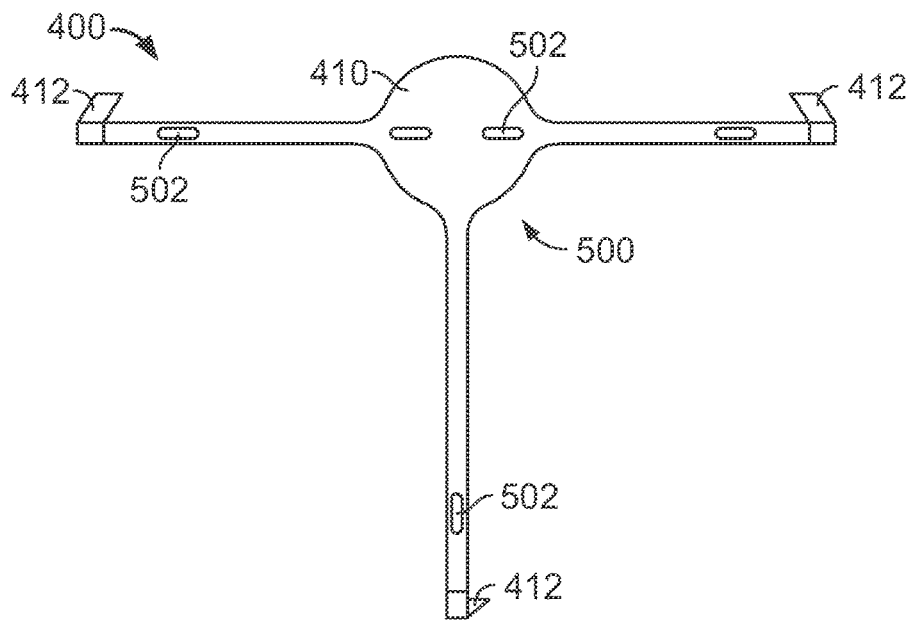
FIG. 3A illustrates a support element according to the invention.
Figure 3B:
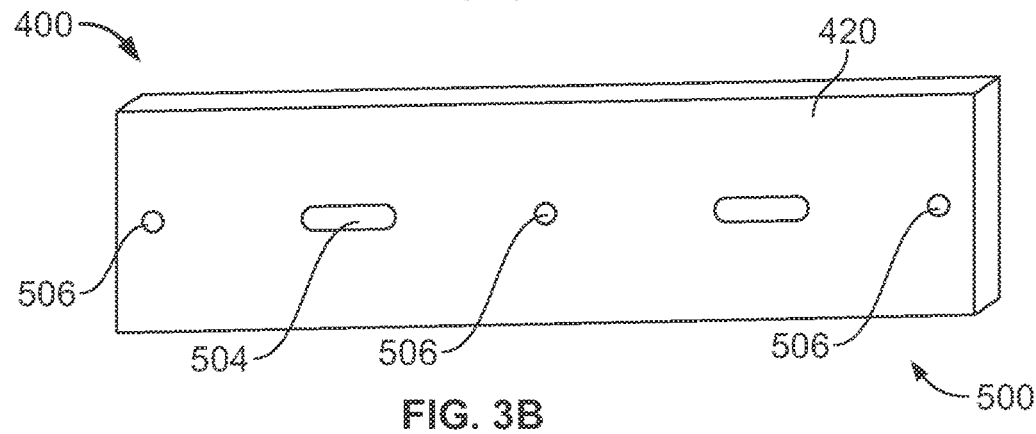
FIG. 3B illustrates another support element according to the invention.
Figure 3C:
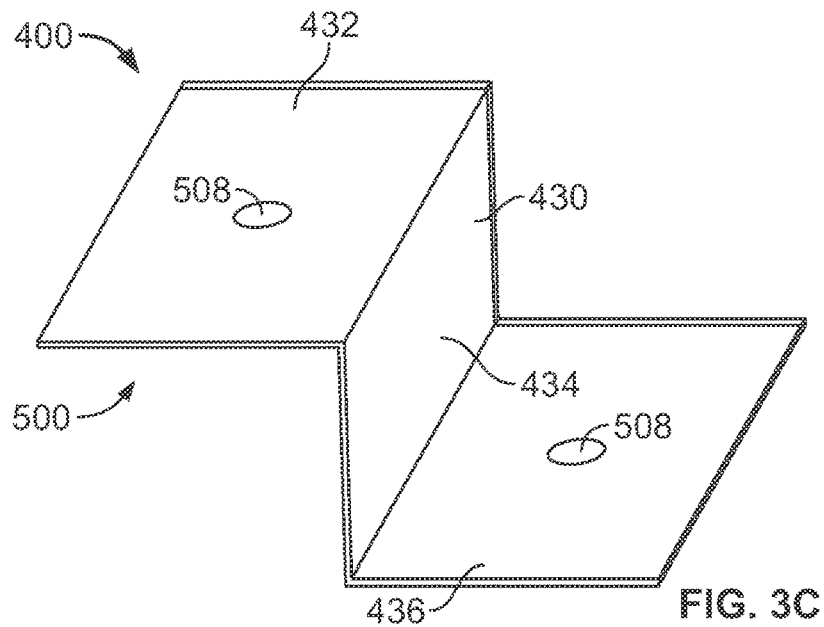
FIG. 3C illustrates another support element according to the invention.
Figure 3D:
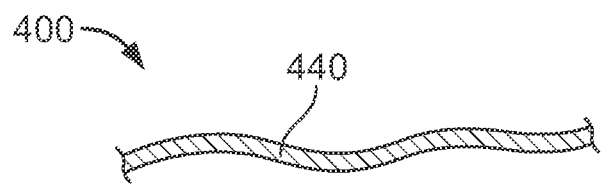
FIG. 3D illustrates another support element according to the invention.
Figure 3E:
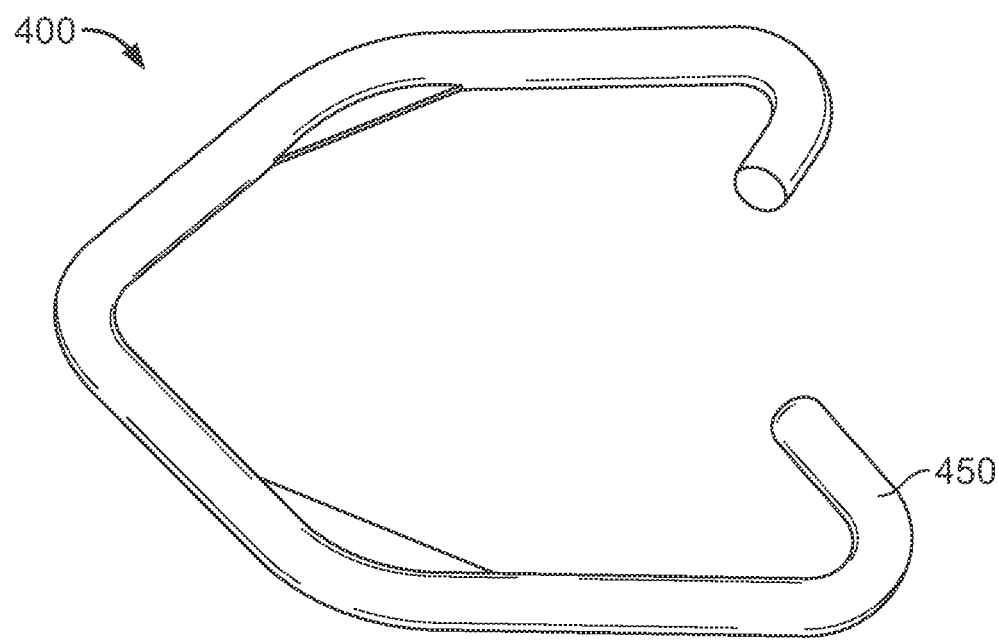
FIG. 3E illustrates another support element according to the invention.
Figure 3F:
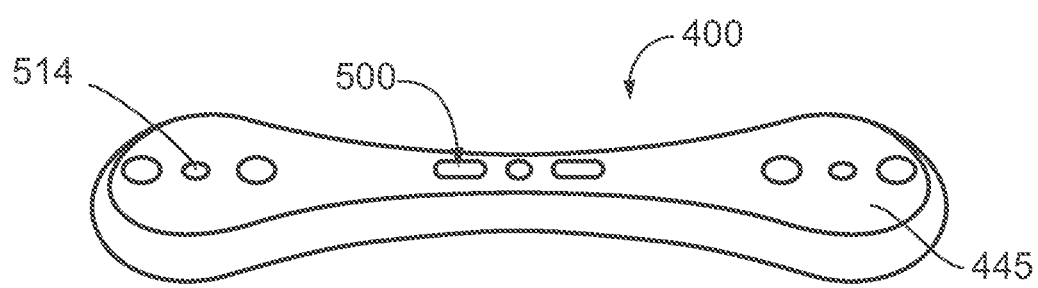
FIG. 3F illustrates another support element according to the invention.
Figure 3G:
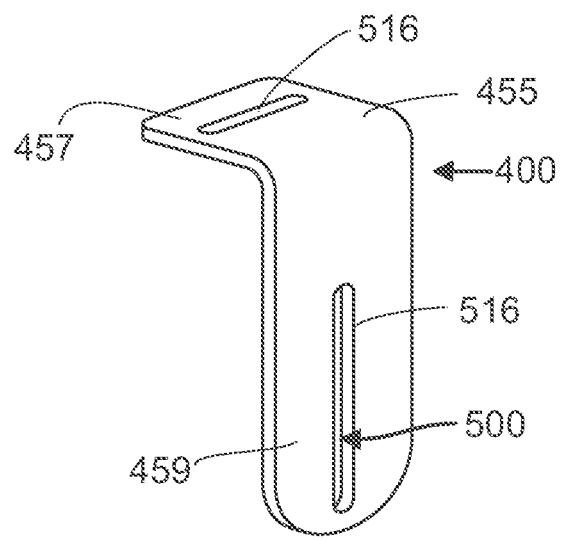
FIG. 3G illustrates another support element according to the invention.

FIGS. 3A through 3L illustrate embodiments of support elements 400, some with connecting elements 500. A variety of support elements 400 are contemplated in addition to those illustrated in FIGS. 3A through 3L, for example such as those shown in FIG. 15, FIG. 16 and FIG. 17. FIG. 3A is a T-shaped brace 410 with legs 412 and connecting elements 500 in the form of slotted openings 502. FIG. 3B is a plate 420. Plate 420 includes connecting elements 500; here plate openings 504 and component openings 506. FIG. 3C is an S-shaped bracket 430. Bracket 430 includes a first form 432 connected to a second form 434, which in turn is connected to a third form 436. The forms 432, 434, 436 are connected at ninety degrees from one another, but any angle is contemplated. As shown, first form 432 and third form 436 include form openings 508. FIG. 3D is a rope 440 and FIG. 3E is a handle 450. FIG. 3F is a beam 445 with beam openings 514. FIG. 3G is an L-shaped brace 455 with a horizontal structure 457 connected at an angle to a vertical structure 459. Brace openings 516 are positioned on each structure 457, 459 of brace 455.

Figure 3H:
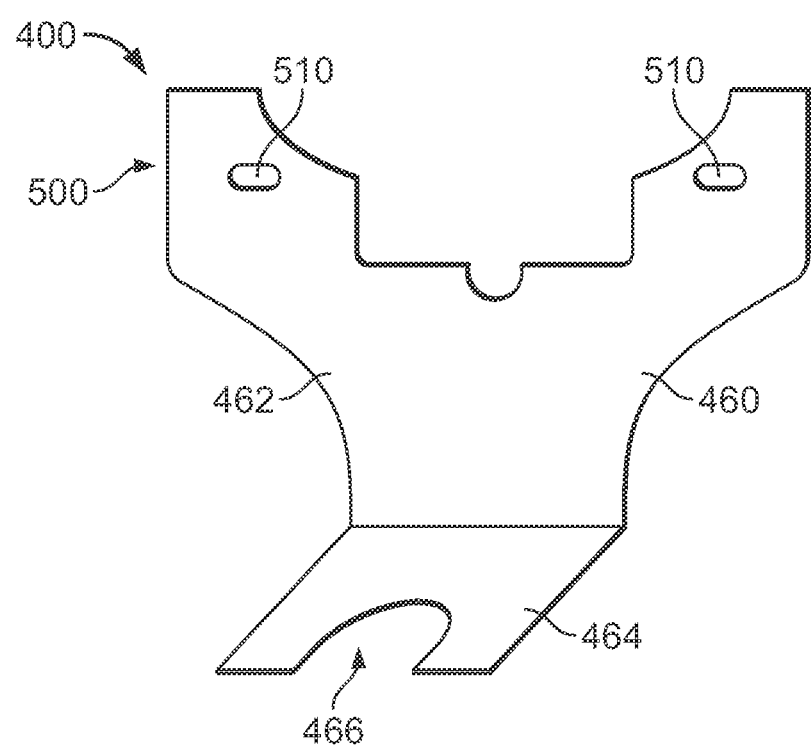
FIG. 3H illustrates another support element according to the invention.

FIG. 3H is a buttress 460. Buttress 460 includes a flat panel 462 connected to an angled panel 464. The flat panel 462 further includes panel openings 510. Once attached to a vacuum device 50, the angled panel 464 clears the vacuum pad 110 and bears the load of the component alleviating stress on the vacuum device 50 such that the pad 110 does not separate from the mounting surface. Arch 466 allows access to tabs 118 of pad 110 in order to release the vacuum device 50. Various sizes and shapes of support elements 400 are contemplated to support the load of the accessory or other element of the invention, for example, a bowl shape, upside dome, or octagonal legs extending 360 degrees around the pad 110.

Figure 3I:
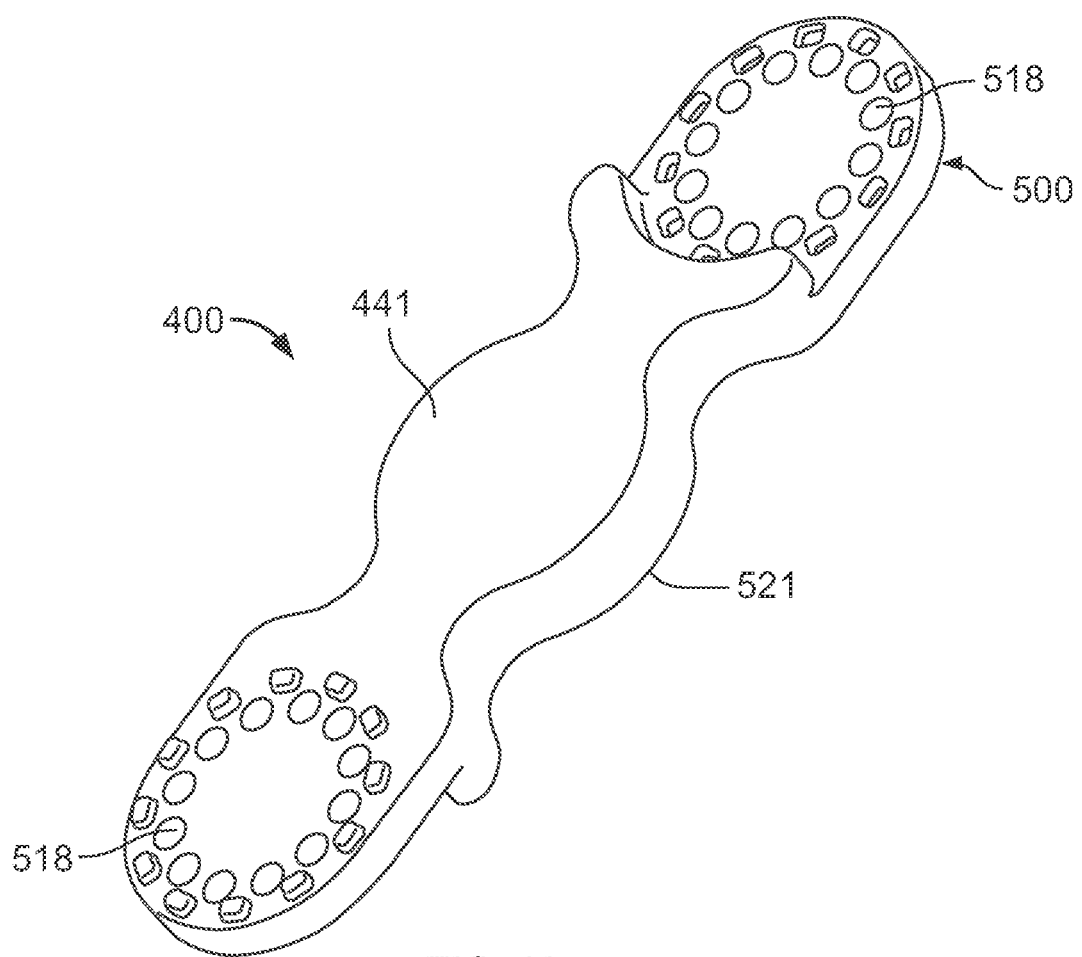
FIG. 3I illustrates another support element according to the invention.

FIG. 3I is a rod frame 441 with an attachment portion 518 positioned on each end of the frame 441. Rod frame 441 further includes a connecting element 500 in the form of a securement protrusion 521.

Figure 3J:
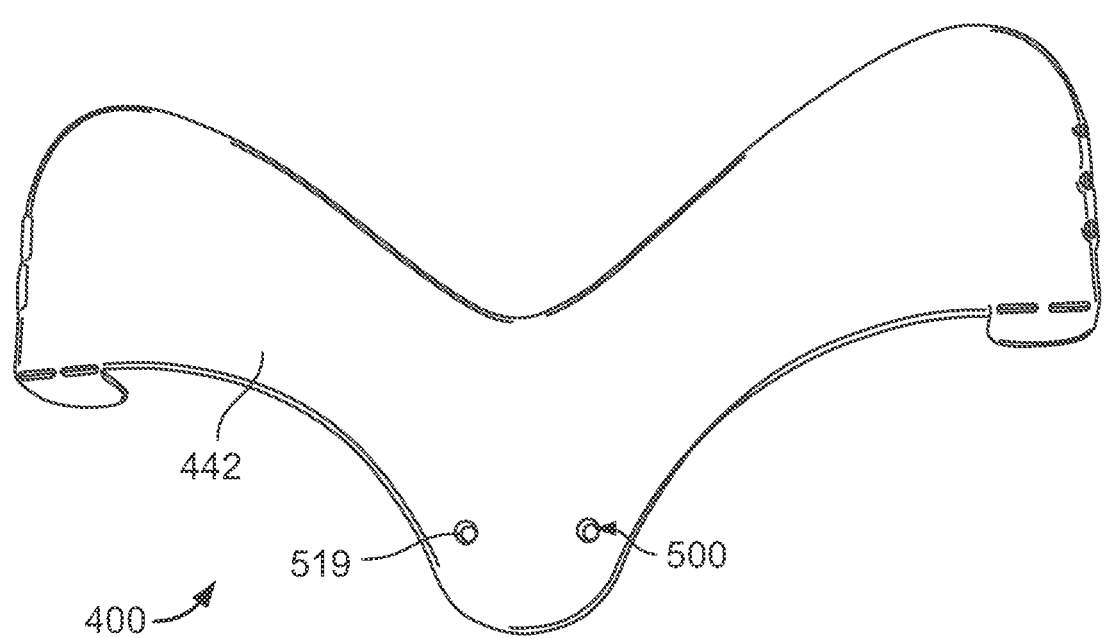
FIG. 3J illustrates another support element according to the invention.

FIG. 3J is a V-shaped brace 442 with connecting element 500 in the form of brace apertures 519.

Figure 3K:
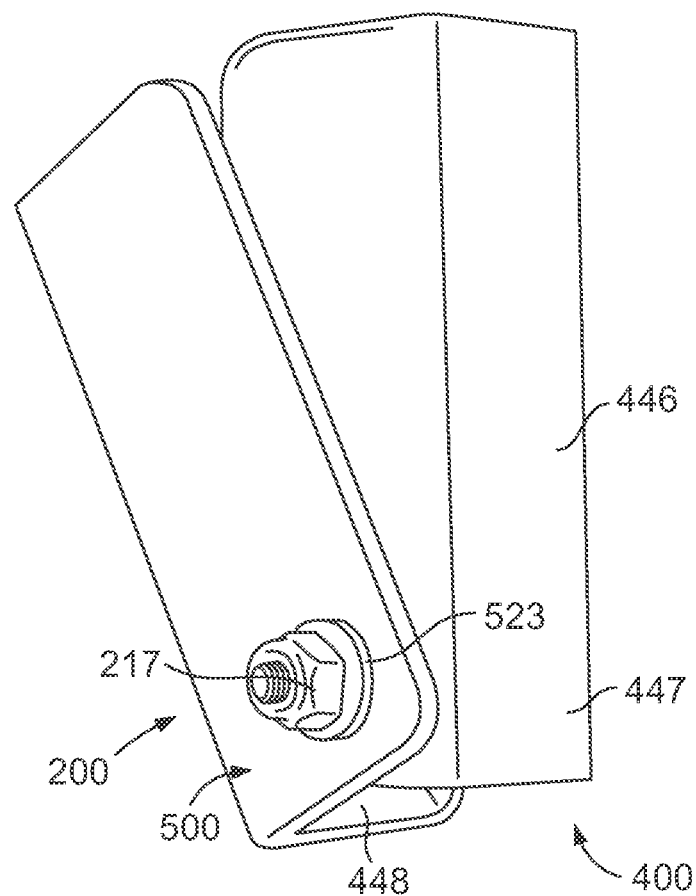
FIG. 3K illustrates another support element according to the invention.

FIG. 3K is a clamp 446 with a moveable element 447 and a stationary element 448. The moveable element 447 and stationary element 448 each include connecting elements 500 as openings 523 such that the elements 447, 448 are unified by hardware 217.

Figure 3L:
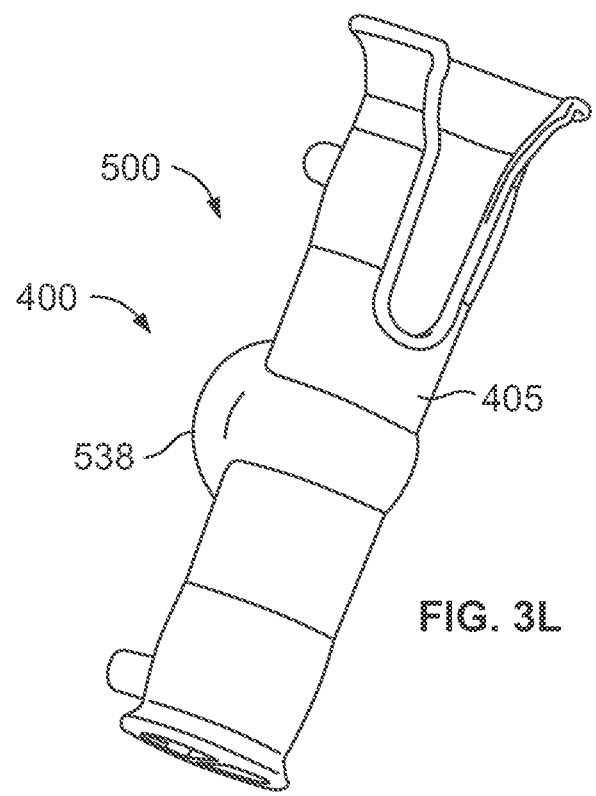
FIG. 3L illustrates another support element according to the invention.

As shown in FIG. 3L, rod receptacle 405 includes an attachment protrusion 538.

Figure 4A:
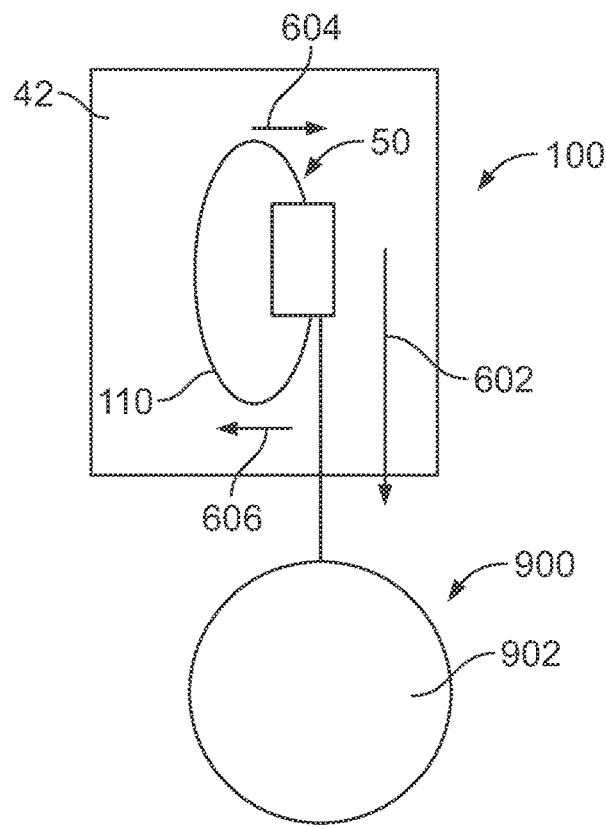
FIG. 4A graphically illustrates how the support element of FIG. 3H helps bear the load of an attached component.
Figure 4B:
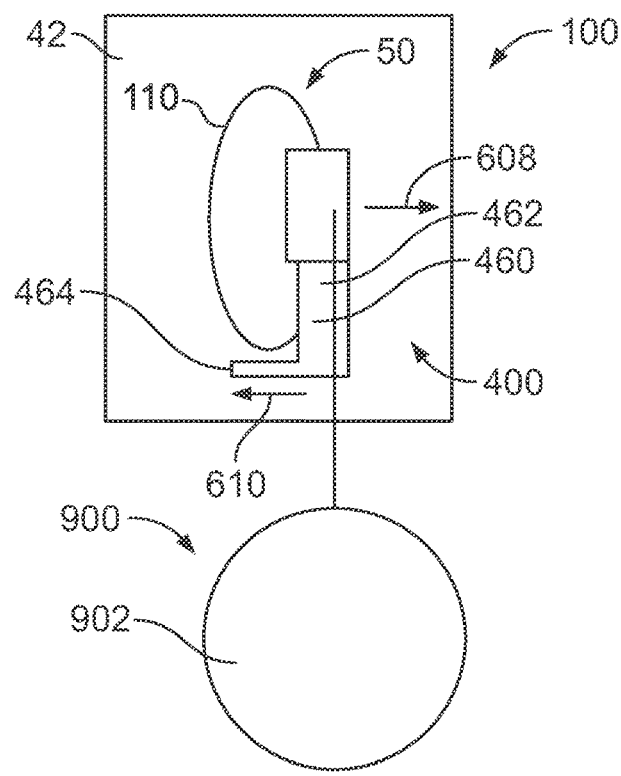
FIG. 4B graphically illustrates how the support element of FIG. 3H helps bear the load of an attached component.

FIGS. 4A and 4B graphically illustrate how the support element 400 of FIG. 3H helps bear the load of an attached component 900 alleviating stress on the vacuum device 50 as well as the entire mounting system 100. FIG. 4A illustrates the mounting system 100 before a support element 400 is connected. As can be seen in FIG. 4A, a large component 900, for example a weighted buoy 902, creates a downward force on the mounting system 100 illustrated by arrow 602. With respect to the mounting surface 42, this downward force 602 causes pad 110 to pull at the top as illustrated by arrow 604 and push at the bottom as illustrated by arrow 606.

After support element 400 is added to the vacuum device 50, forces are re-distributed. As shown in FIG. 4B, the buttress 460 of FIG. 3H is connected to the mounting system 100. The buttress 460 acts as a pivot such that downward force illustrated by arrow 602 in FIG. 4A is now partially supported by angled panel 464 of buttress 460 such that a force pulls at the center of the mounting system 100 as illustrated by arrow 608 in FIG. 4B. With respect to the mounting surface 42, while the force 608 pulls at the center of the mounting system 100, a force also pushes on the buttress 460 as illustrated by arrow 610. Thus, the buttress 460 eliminates the pull at the top of the pad 110 as illustrated by arrow 604 in FIG. 4A, thereby mitigating separation of the pad 110 from the mounting surface 42.

FIG. 5 through FIG. 37 illustrate embodiments of mounting systems for use with surfaces of water vessels, but, again, the invention is applicable to mounting any component or accessory and further mounting it to any surface, for example, surfaces of a trailer, automobile, recreational vehicle, snowboard, residential and commercial structures, or even a wall, cabinet, refrigerator, and shower to name a few.

Figure 5:
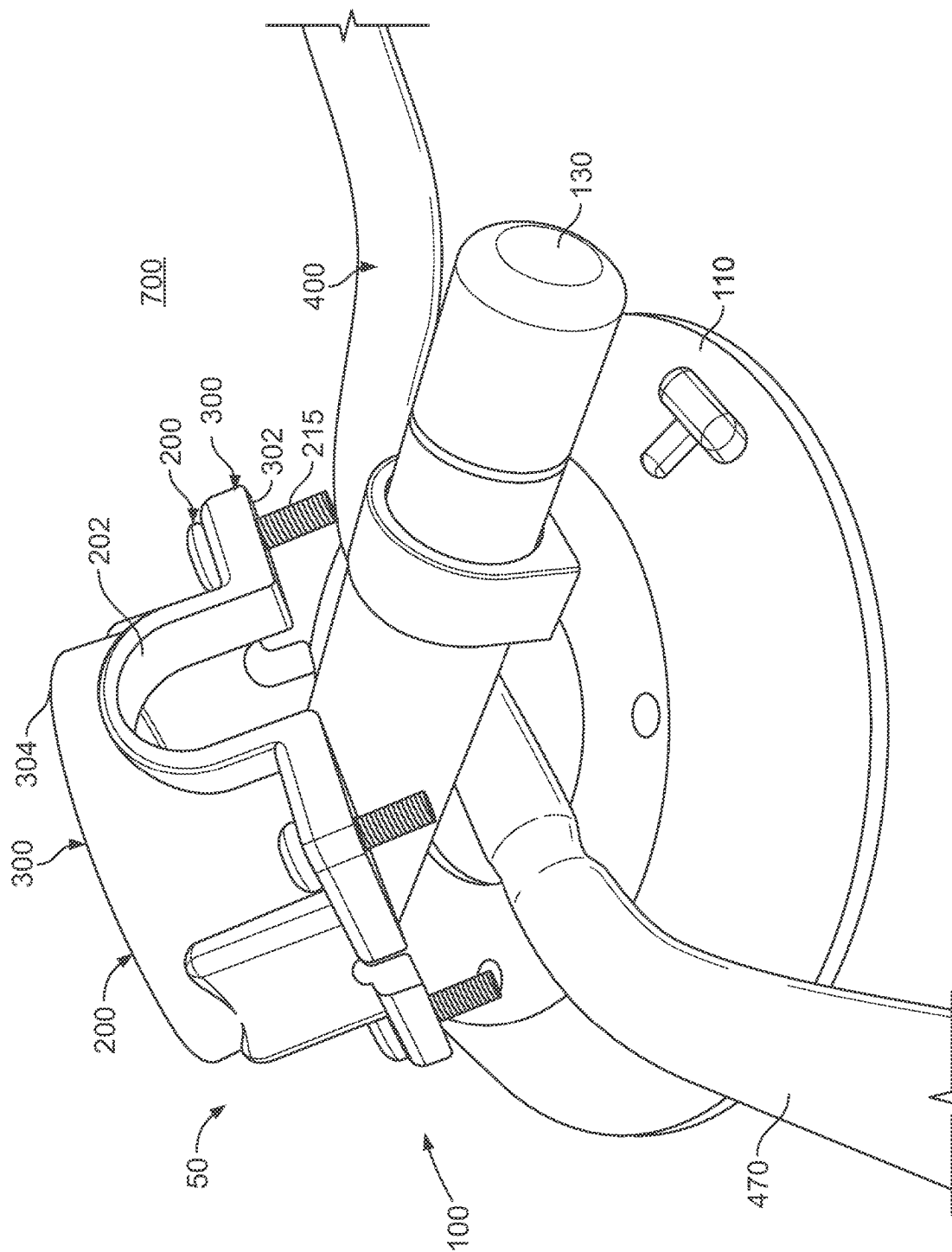
FIG. 5 illustrates a mounting assembly according to the invention.

FIG. 5 illustrates a mounting assembly 700 comprising a mounting system 100—vacuum device 50, with a housing 200 including attachment elements 300. More specifically, FIG. 5 illustrates a mounting assembly 700 including the mounting system 100 as shown in FIG. 2A and a support element 400. As shown in FIG. 5, bendable support element 470 is secured by housing 202. Bendable support element 470 is flexible to accommodate any accessory or other element of the invention and additionally stabilize the mounting assembly 700. Components 900 can be secured to slot 304 of housing 202 and/or be supported by bendable support element 470. Bendable support element 470 can likewise act as a lanyard from which accessories 900 or other items can be secured or suspended.

Figure 6:
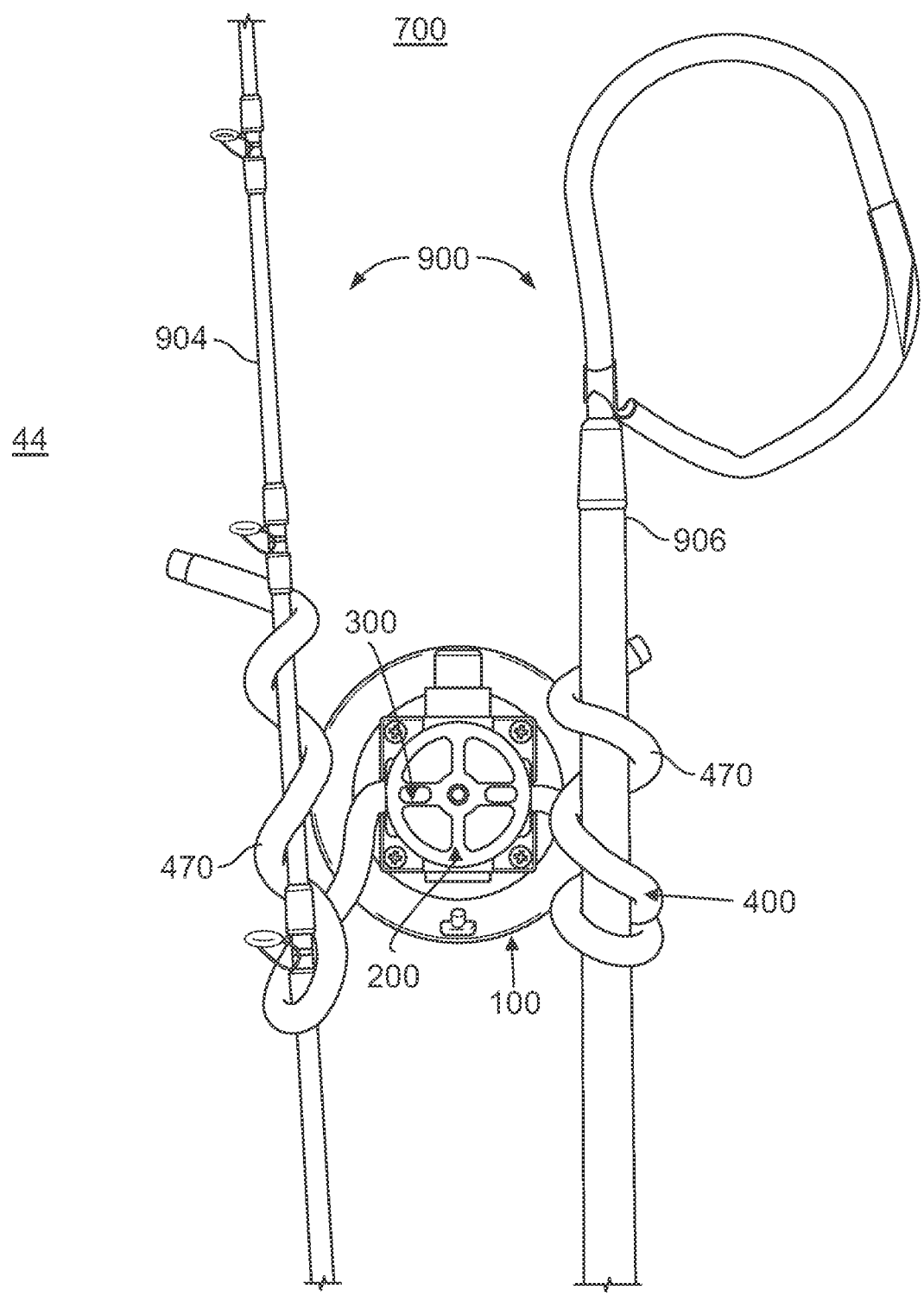
FIG. 6 illustrates another mounting assembly according to the invention.

As shown in FIG. 6, the mounting assembly 700 of FIG. 5 engages with a mounting surface 44 such that the bendable support element 470 can be manipulated to hold any type of accessory 900, here a fishing pole 904 and gaff 906.

Figure 7:
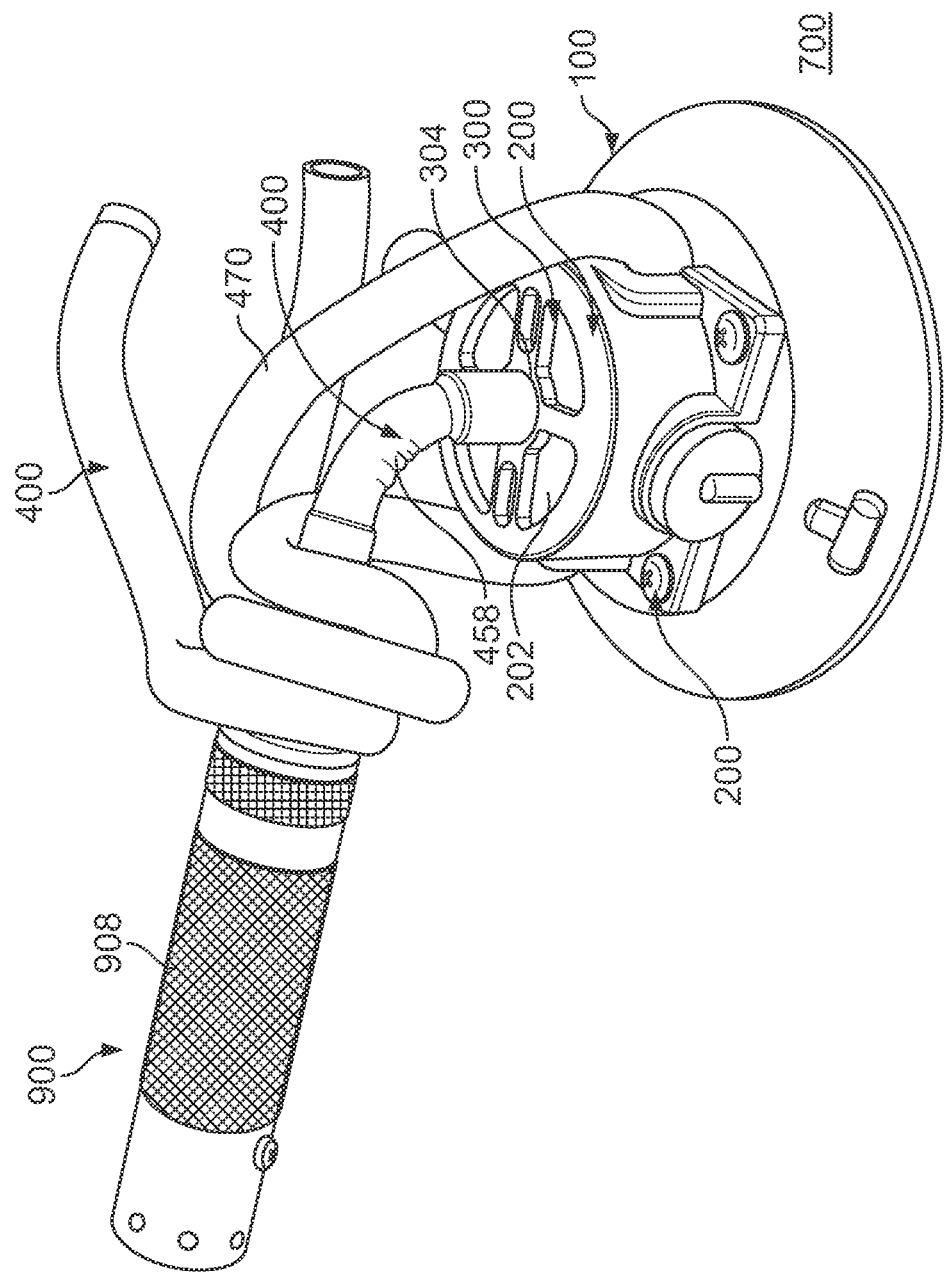
FIG. 7 illustrates another mounting assembly according to the invention.

FIG. 7 illustrates another application of the mounting assembly 700 of FIG. 5. A light accessory 908 is secured to a support element 400 shown as a pliable extension 458. The pliable extension 458 is further connected to a threaded hole 303 of square shaped housing 202. The pliable extension 458 allows for various arrangements. of light accessory 908. Bendable support elements 470 provide additional stability to the light accessory 908.

Figure 8:
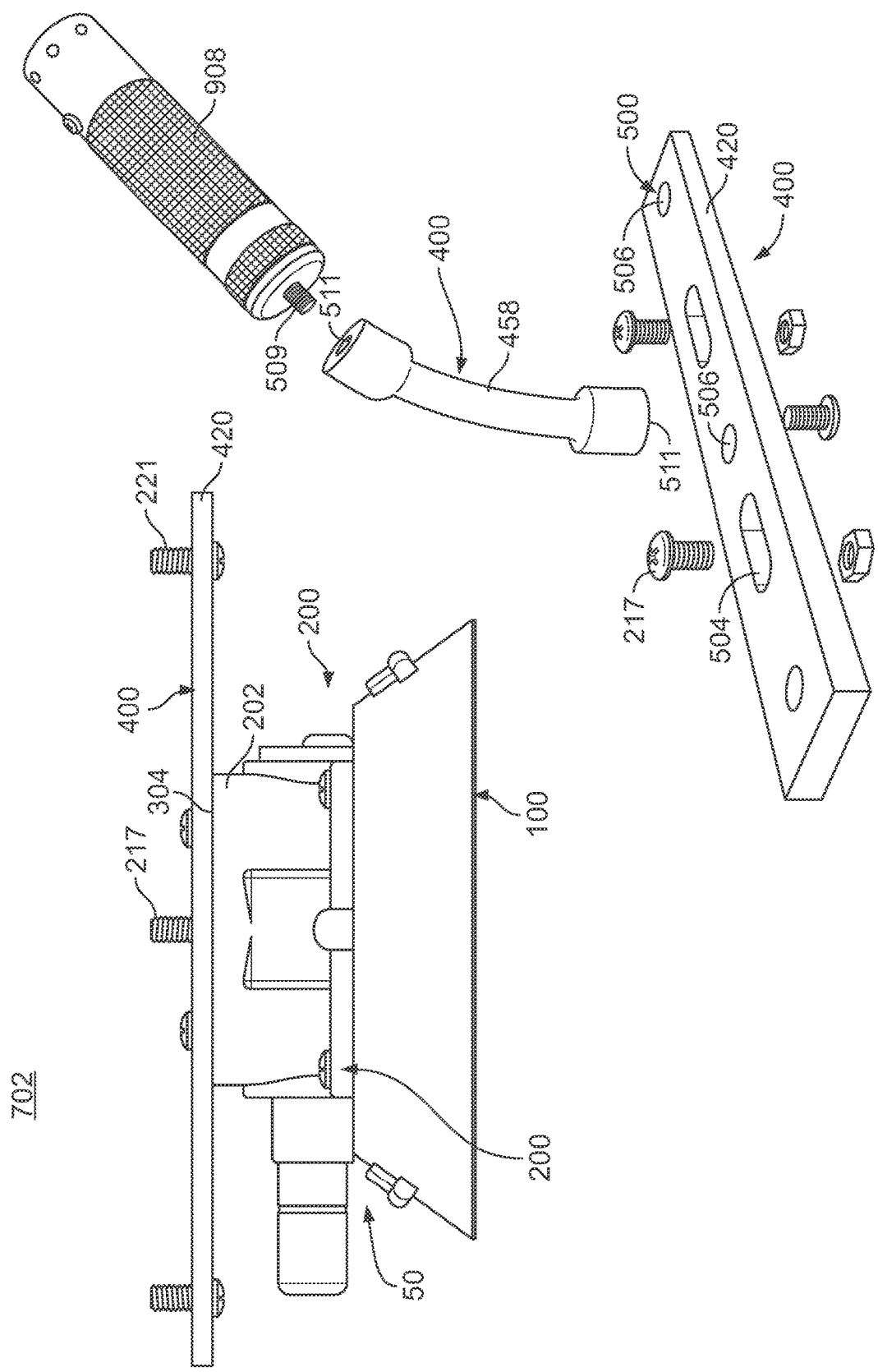
FIG. 8 illustrates another mounting assembly according to the invention.

FIG. 8 illustrates a mounting assembly 702 comprising a vacuum device 50, a housing 200, and two support elements 400. Support elements 400 further include connecting elements 500 for attachment to the mounting system 100 as shown in FIG. 2A. Support elements 400 are shown as plate 420 according to FIG. 3B and pliable extension 458. Plate 420 includes connecting elements 500 shown as plate openings 504 and component openings 506. Plate 420 is connected to housing 202 such that slot 304 on housing 202 align with plate openings 504. Hardware 217 secures the plate 420 to the housing 202 as well as threaded through component openings 506 such that accessories 900 can be secured thereto. As shown, pliable extension 458 includes connecting elements 500 shown as two female adaptors 511 located at the top and bottom of the extension 458. Light accessory 908 includes a male adaptor 509 that is received within the top female adaptor 511. Bottom female adaptor 511 receives hardware 217 for securement of the accessory 900 to the plate 420. Again, extension 458 is pliable to allow for various arrangements of light accessory 908.

Figure 9:
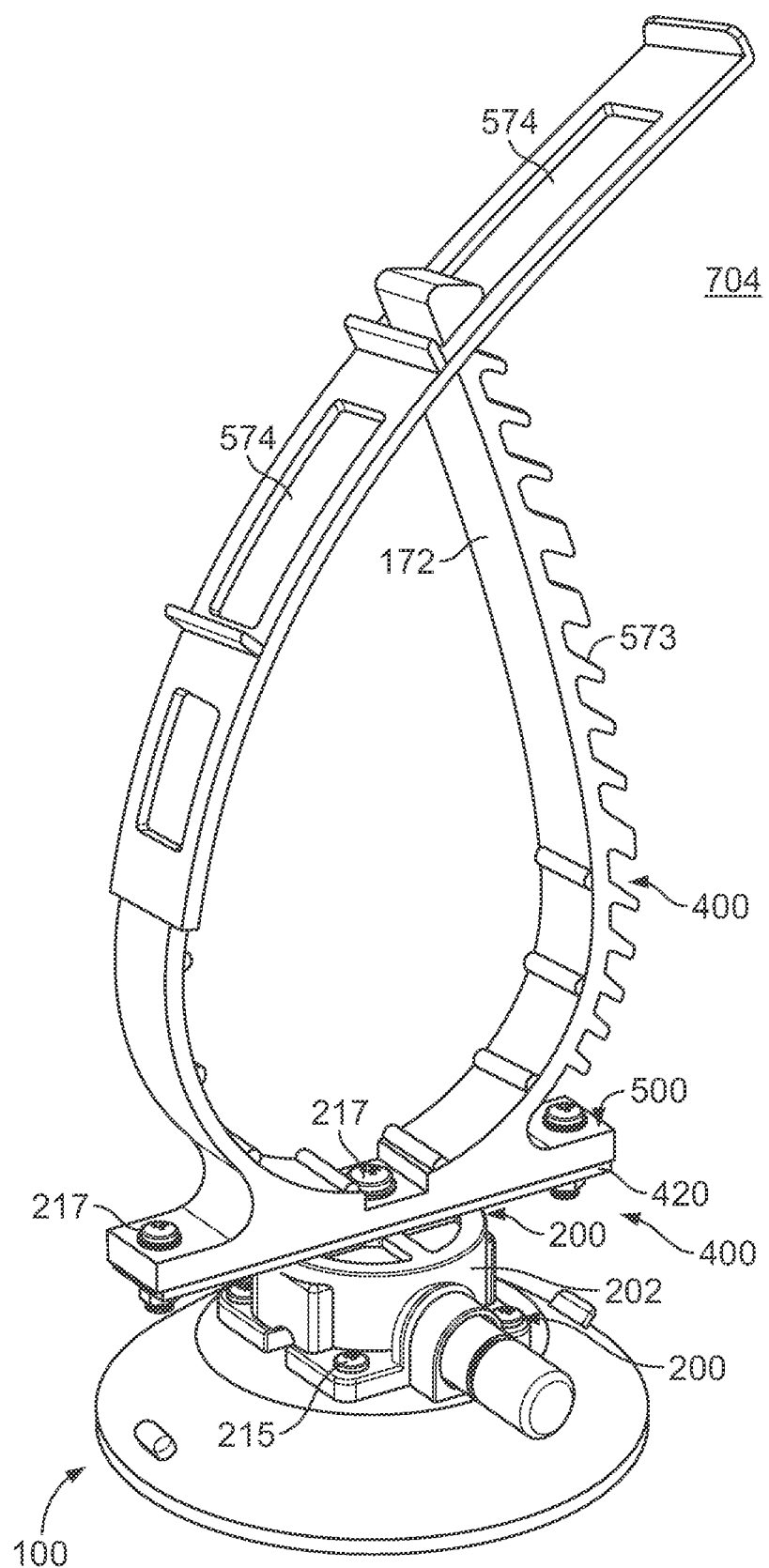
FIG. 9 illustrates another mounting assembly according to the invention.

FIG. 9 illustrates a mounting assembly 704 comprising support elements 400 of the plate 420 according to FIG. 3B and strap 472. Plate 420 includes connecting elements 500 shown as plate openings 504 and component openings 506. Plate 420 is connected to housing 202 such that slot 304 on housing 202 align with a with plate openings 504. Hardware 217 secures the strap 472 to the plate 420 and further to the housing 202 via component openings 506. As shown, strap 472 includes connecting elements 500 as an open rack 574 and plurality of ratchets 573. Ratchets 573 engage with rack 574 such that strap 472 surrounds and secures an accessory 900 such as a dive tank.

Figure 10:
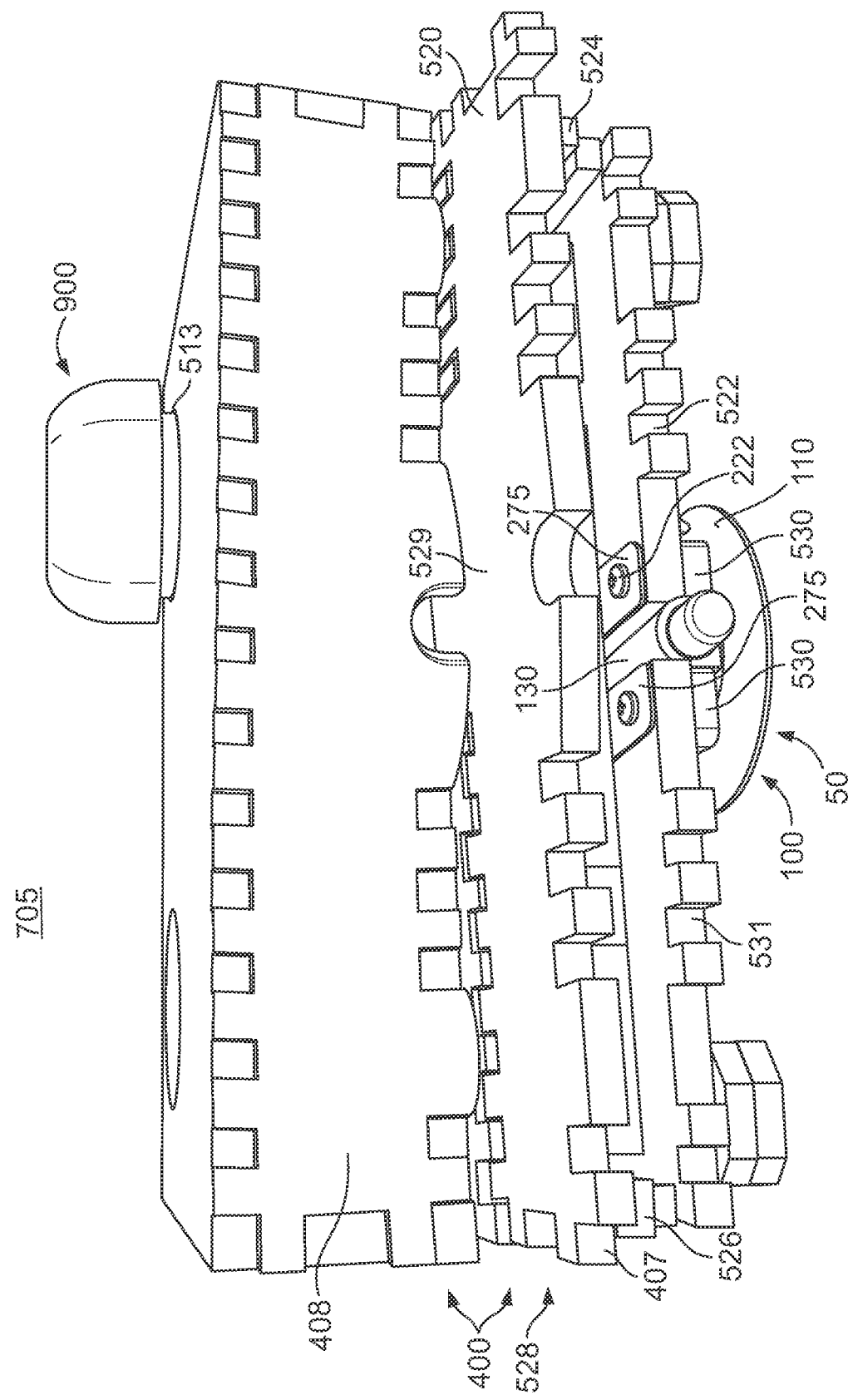
FIG. 10 illustrates another mounting assembly according to the invention.

With reference now to FIG. 10, the mounting assembly 705 comprises the vacuum device 50, including vacuum pad 110 and vacuum pump 130, with a housing 200 and clamp 275 to attach a first tray 407. Tray 407 may be used to store for example a tackle box (not shown). The first tray 407 consists of a top portion 520, a bottom portion 522, a first side portion 524, a second side portion 526, a back portion 528 (not visible in this illustration), and a front portion 529. The bottom portion 522 also has feet 530 to support the bottom portion 522 and to provide space for the vacuum device 50.

The portions 520, 522, 524, 526, 528, and 529 may be formed of a foam or sponge product having finger joint portions 531 along the periphery of one or more portions 520, 522, 524, 526, 528, and 529. The finger joint portions 531 allow the portions 520, 522, 524, 526, 528, and 529 to be locked together and also to be easily separated from each other, for example, to store or transport the first tray 407. The portions 520, 522, 524, 526, 528, and 529 may also include other cutout portions of various shapes and sizes. The front portion 529 is adapted to be closed to secure an accessory such as a tackle box within the tray 407 as may be required.

The first tray 407 is attached to the vacuum device 50 by placing feet 530 over pad 110. The bottom portion 522 of tray 407 is positioned over the feet 530. Hardware 222 secures clamp 275 for attachment of the tray 407 to the vacuum device 50.

FIG. 10 also illustrates a second tray 408 shown being placed or stacked on top of the first tray 407. Numerous embodiments are contemplated for combining the second tray 408 with the first tray 407. As an example, the top portion 520 of the first tray 407 may include finger joint portions 531 to receive the second tray 408. The second tray 408 is constructed in a similar manner and with similar components as the first tray 407. However, the second tray 408 is connected to the vacuum device 50 via the first tray 407.

It is also contemplated that the first tray 407 and second tray 408 include connecting elements 500 such as a cutout for accepting various other items. The cutouts can be of any size or shape to accommodate various other accessories, for example, beverages, waterproof cases, lure tubes, etc. For example, as shown in FIG. 10, second tray 408 includes a cutout 513 to accommodate an accessory 900 such as a can, cup, bottle, or other item. As another example, side portions 524, 526 of first tray 407 includes a cutout (not shown) for lure storage systems such as lure tubes and tackle bags.

For example, a fisherman may construct the first and second tray 407, 408 by connecting all of the portions 520, 522, 524, 526, 528, and 529 together by use of the finger joints 531 to form the trays 407, 408. The vacuum device 50, along with clamp 275 and hardware 222, secures the trays 407, 408 to the surface of a water vessel, for example, the top of the console or gun whale. Tackle boxes are inserted into each of the trays 407, 408. When the fisherman is done, the tackle boxes may be removed from the trays 407, 408. The trays 407, 408 may then be disassembled for storage or transportation. It is also possible and contemplated that the mounting assembly 705 may have any number of trays. For example, the mounting assembly 705 may have two or more trays stacked upon the first tray 407. In this manner, more than two trays may be employed with the mounting assembly 705.

Figure 11:
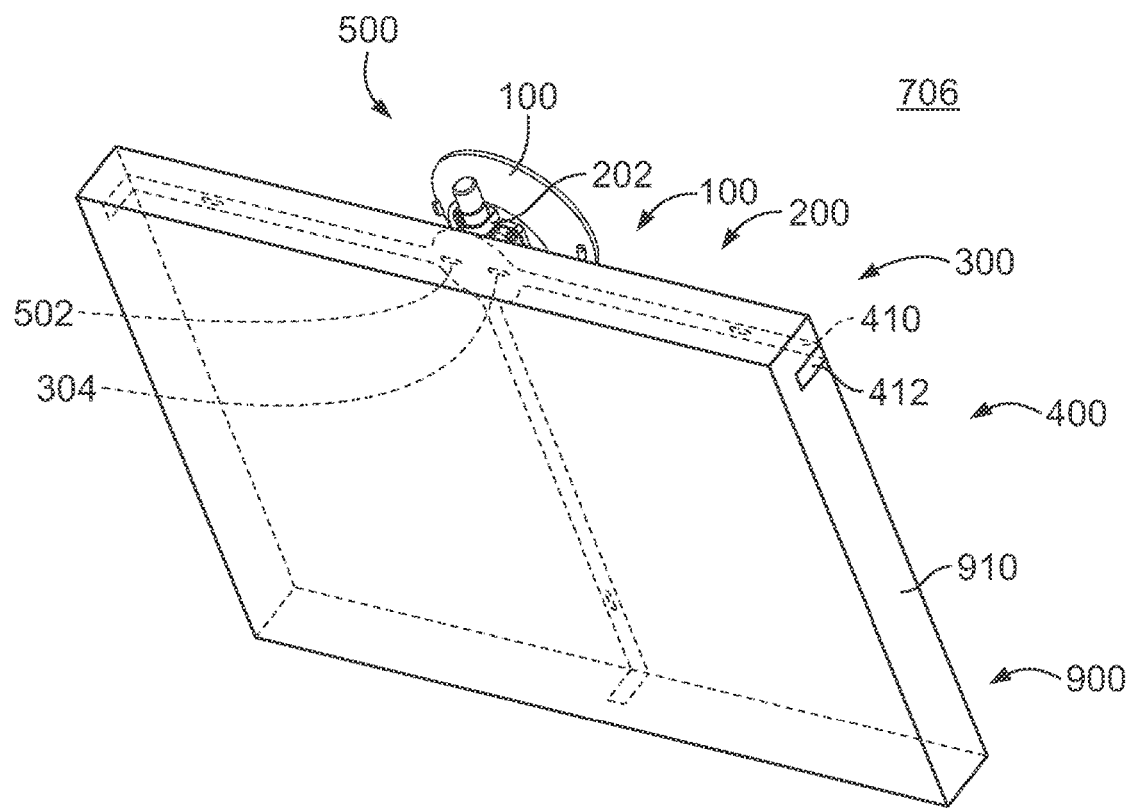
FIG. 11 illustrates another mounting assembly according to the invention.
Figure 12:
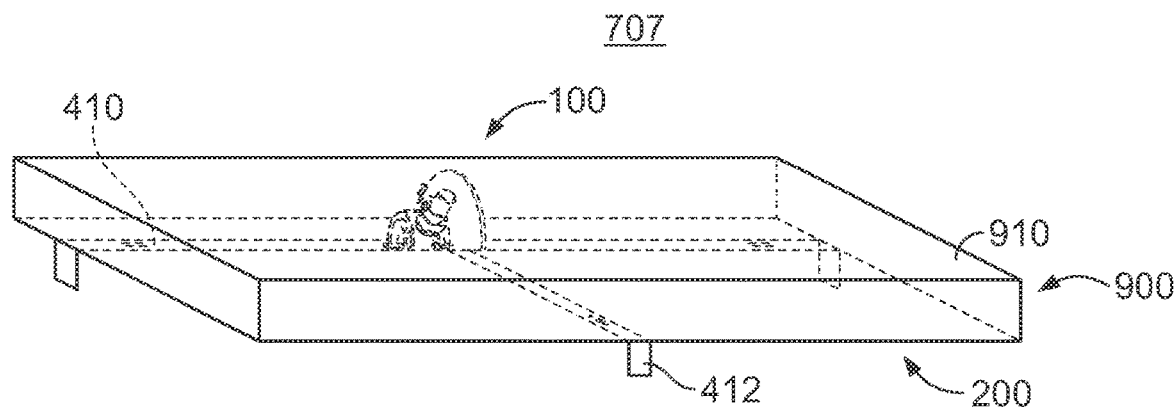
FIG. 12 illustrates another mounting assembly according to the invention.

FIG. 11 and FIG. 12 illustrate mounting systems 706, 707 respectively that include the mounting system 100 as shown in FIG. 2A. The support element 400, shown as a T-shaped brace 410 in FIG. 3A, allows for a vertical and horizontal configuration of a component 900. As shown in FIG. 11 and FIG. 12, slotted openings 502 of the brace 410 connect with slots 304 of housing 202. FIG. 11 illustrates a mounting assembly 706 wherein the T-shaped brace 410 is attached to housing 202 such that a tackle box 910 is positioned within legs 412 for a vertical mount. FIG. 12 illustrates a mounting assembly 707 wherein the T-shaped brace 410 is attached to housing 202 such that a tackle box 910 is positioned on top of legs 412 for a horizontal mount.

Figure 13:
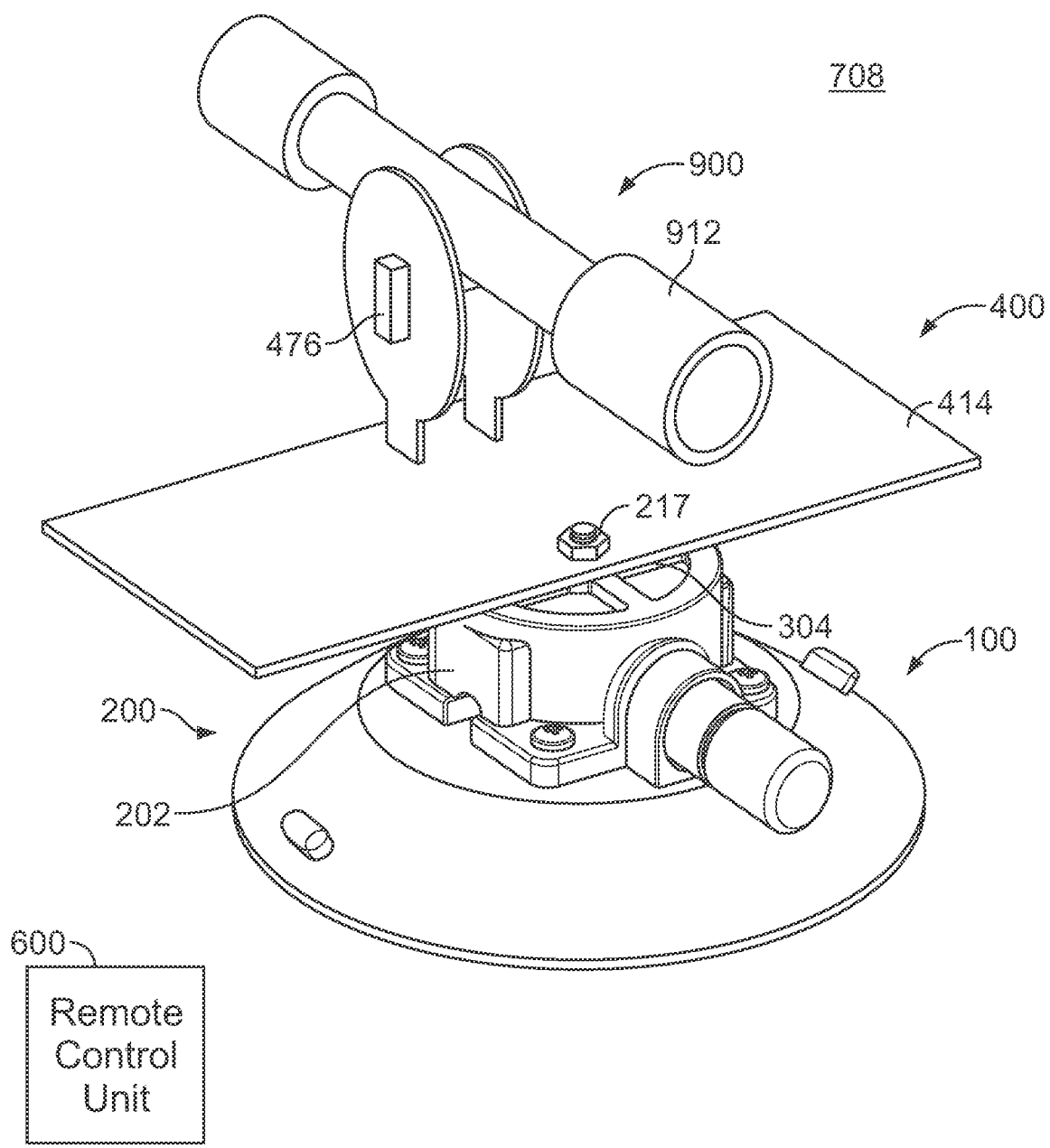
FIG. 13 illustrates another mounting assembly according to the invention.

With particular reference now to FIG. 13, mounting assembly 708 depicts another preferred embodiment of a mounting system 100 as shown in FIG. 2A according to the invention. The mounting assembly 708 is used to hold or secure a light component 912 to a surface, such as a surface of a boat for safely boating at night. The mounting assembly 708 comprises a support element 400 shown as plane 414. The plane 414 is mounted to the square shaped housing 202 of the mounting system 100 by use hardware 217. More specifically, the hardware 217 connects the plane 414 to slot 304 of housing 202. A light accessory 912 is mounted to the plane 414 via a ball socket holder 476. The mounting assembly 708 includes a remote control device 600 that is used to receive signals from a remote control transmitter (not shown). The remote control device 600 is used to turn the light accessory 912 on and off as needed.

As can be appreciated, the mounting assembly 708 may be positioned on any surface wherever a light is needed. For example, the mounting assembly 708 may be mounted to the bow of the boat. When the light accessory 912 needs to be turned on, a signal, such as a radio frequency signal, is sent from a remote control transmitter to the remote control device 600 that controls power to the light accessory 912 such as a high-powered flashlight.

Figure 14:
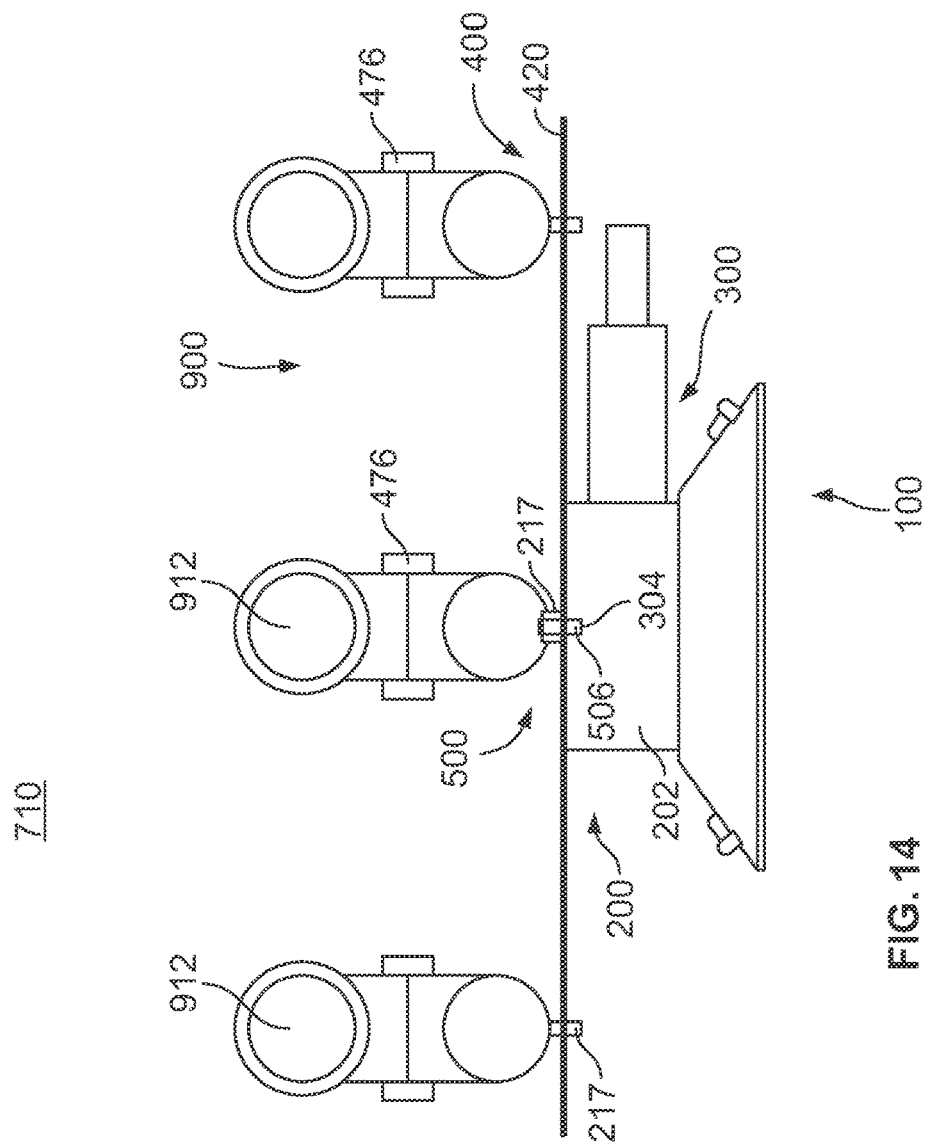
FIG. 14 illustrates another mounting assembly according to the invention.

A mounting assembly 710, as shown in FIG. 14, comprises a support element 400 to mount more than one light accessory 900. The plate 420, as shown in FIG. 3B, is secured to the housing 202 of the mounting system 100 by use of hardware 217. Hardware 217 secures the connecting elements 500 of plate 420 to slot 304 of housing 202. Each light accessory 912 is mounted to the plate 420 via a ball socket holder 476. Similar to FIG. 13, the mounting assembly 710 may include a remote control device 600 to activate one or more of the light accessory 912.

It is also contemplated that more than one mounting assembly 710 may be attached to a mounting surface and the mounting assembly 710 may be easily removed from the mounting surface and repositioned to another mounting surface. For example, once the boat is in a position for fishing at night the mounting assembly 710 may be moved to the center console of the boat to light up the interior of the boat for fishing. Although not shown, a removable cover such as a red filter may be used with the mounting assembly 710 for night vision work.

Figure 15:
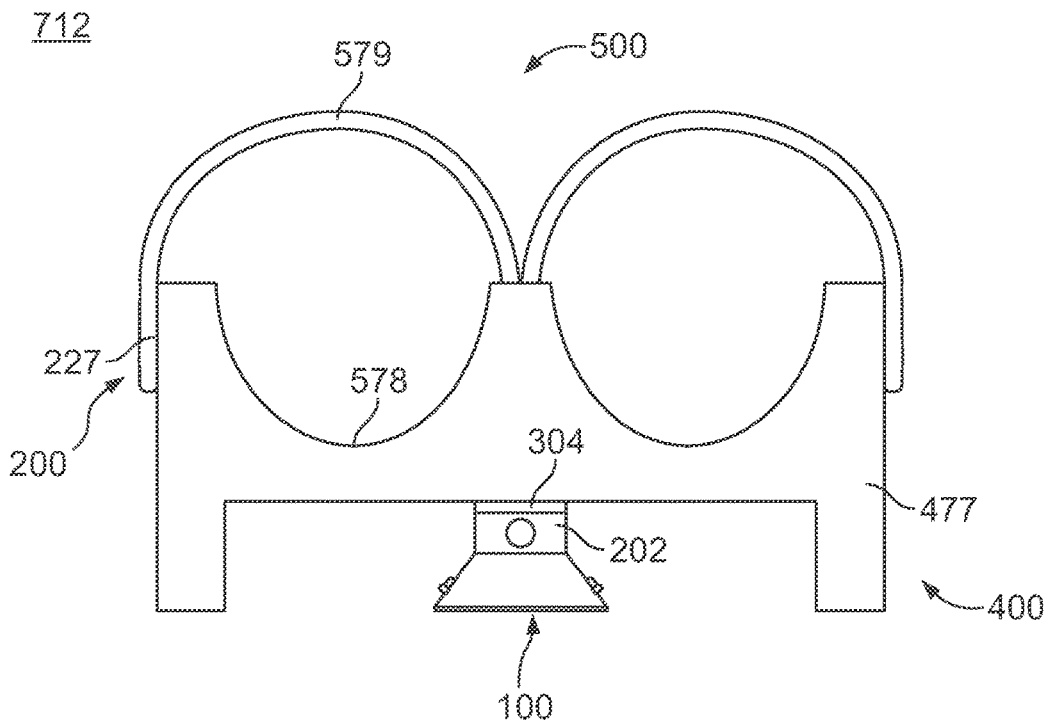
FIG. 15 illustrates another mounting assembly according to the invention.

FIG. 15 illustrates another preferred embodiment of a mounting assembly 712. The mounting assembly 712 is used to hold or secure a pair of dive tanks (not shown). The mounting assembly 712 comprises the mounting system 100 as shown in FIG. 2A connected to a support element 400 shown as plane 477. The plane 477 may be manufactured from starboard, for example. The plane 477 has a pair of connecting elements 500 in the form of semi-circular cutouts 578 including strap 579. The cutouts 578 are sized and shaped to hold a pair of dive tanks. Strap 579 is used to further secure a dive tank in place. The strap 579 has hook and loop fasteners 227 to secure the strap 579 to plane 477. As shown, plane 477 is connected to slot 304 of housing 202.

In operation, the mounting assembly 712 is placed on the deck of the boat and the vacuum device 50 is engaged to hold the mounting assembly 712 in place. A dive tank is placed in a cutout 578 and the respective strap 579 is secured in place about the dive tank. The hook and loop fasteners 227 are used to hold the strap 579 in place.

Figure 16:
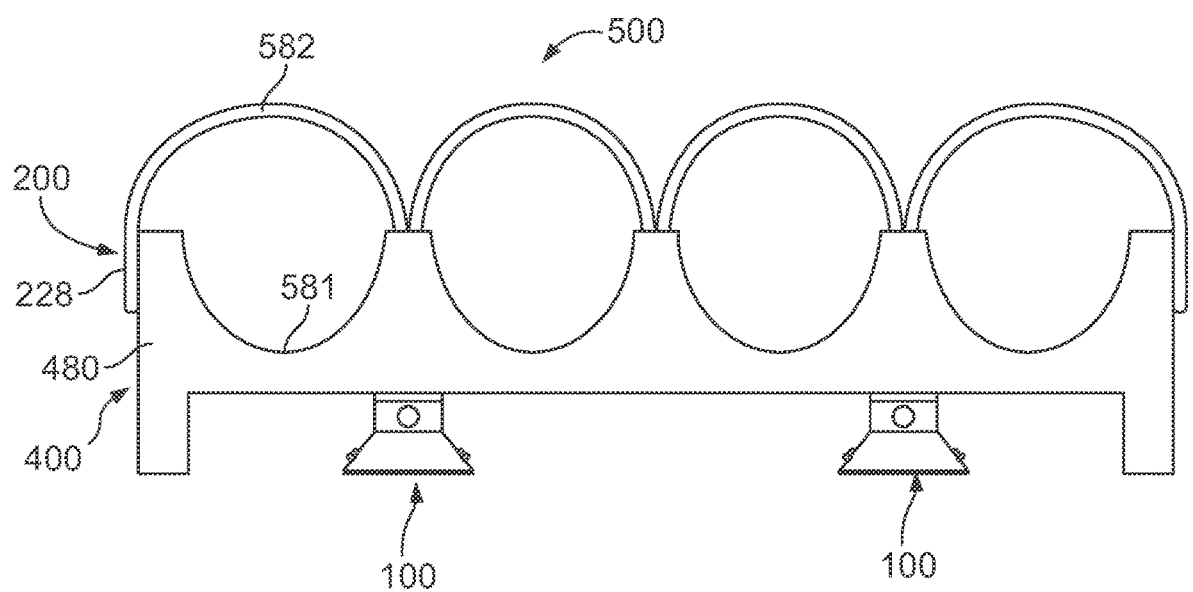
FIG. 16 illustrates another mounting assembly according to the invention.

FIG. 16 illustrates a mounting assembly 714 including the mounting system 100 as shown in FIG. 2A. The mounting assembly 714 is used to hold or secure a plurality of dive tanks (not shown). The mounting assembly 714 comprises two assemblies 100 connected to a plane 480. The plane 480 may be manufactured from starboard as mentioned above. In this embodiment, the plane 480 has connecting elements 500 in the form of four of semi-circular cutouts 581 that are sized and shaped to hold a plurality of dive tanks. Strap 582 is used to further secure a dive tank in place. As above, strap 582 has hook and loop fasteners 228 to secure the strap 582 to plane 480.

Similar to FIG. 15, the mounting assembly 714 may be placed on the deck of a boat with the vacuum devices 50 engaged to hold the mounting assembly 714 in place. A dive tank is placed in a cutout 581 and the respective strap 582 is secured in place via fasteners 227 about the dive tank.

Figure 17:
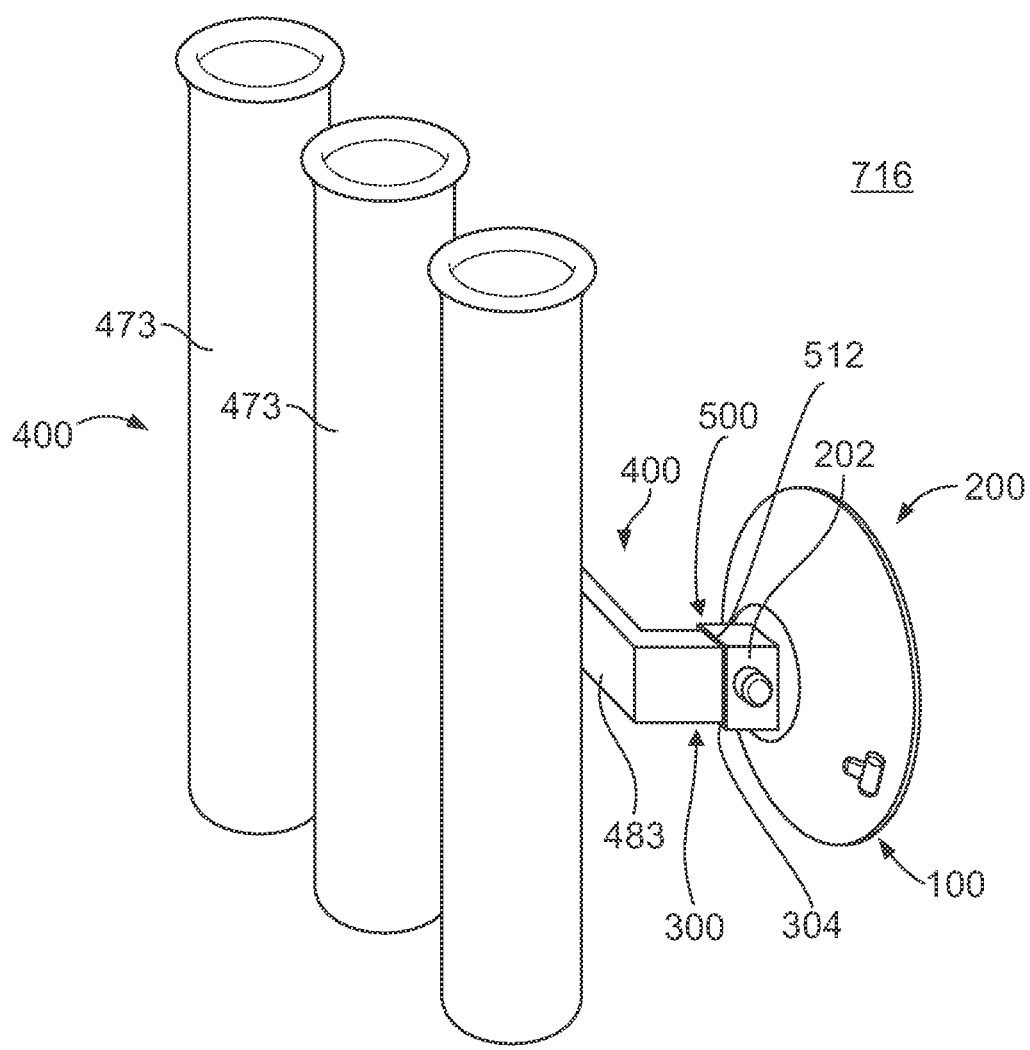
FIG. 17 illustrates another mounting assembly according to the invention.

FIG. 17 illustrates a mounting assembly 716. Vacuum pad 110 and vacuum pump 130 are integrated by housing 202 as described in reference to FIG. 2A. Track 483 includes track openings 512 that align with slot 304 of housing 202. Hardware secures track openings 512 with housing 202. Track 483 allows a variety of components 900 and/or support elements 400 to be attached thereto such as slideably engaging with track 483. As shown in FIG. 17, rod holder 473 slides onto track 483. This embodiment of the invention allows a plurality of rod holders 473 to slide onto track 483 in order to secure components 900 such as a fishing pole.

Figure 18:
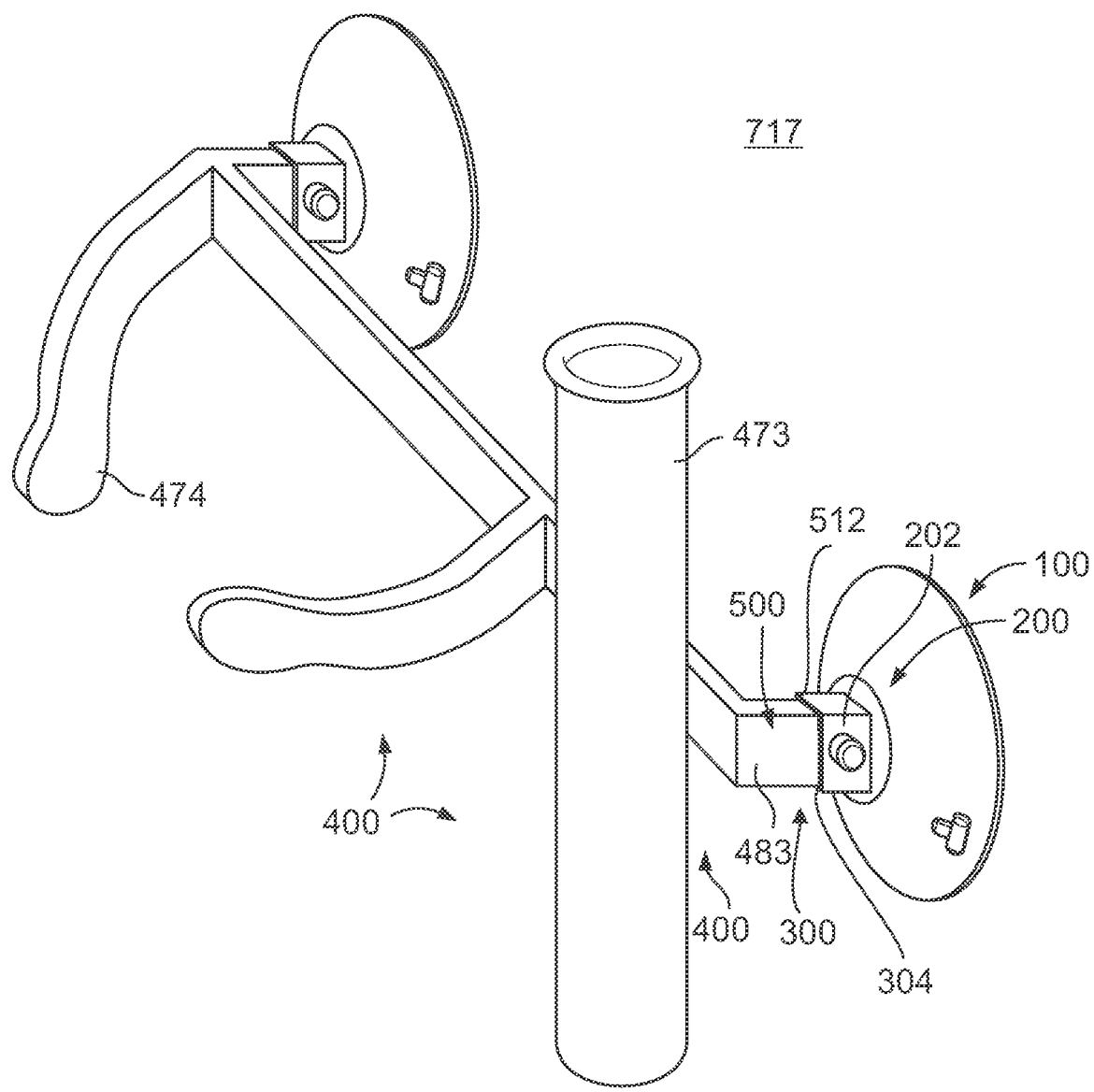
FIG. 18 illustrates another mounting assembly according to the invention.

FIG. 18 illustrates a mounting assembly 717 with various other support elements 400 slideably engageable on track 483. Again, track openings 512 align with slot 304 of housing 202. Hardware secures track openings 512 with housing 202. Dive tank holder 474 slideably engages on track 483 along with rod holder 473.

Track 483 allows for numerous support elements 400 to slideably engage thereon. For example, multiple rod holders 473, dive tank holders 474 or a combination thereof can be slideably engaged onto track 483 in order to retain accessories 900 such as a fishing pole or dive tank. It should also be noted that rod holders 473 and dive tanks holders 474 can also be attached directly to the mounting system 100, more specifically housing 202.

Figure 19:
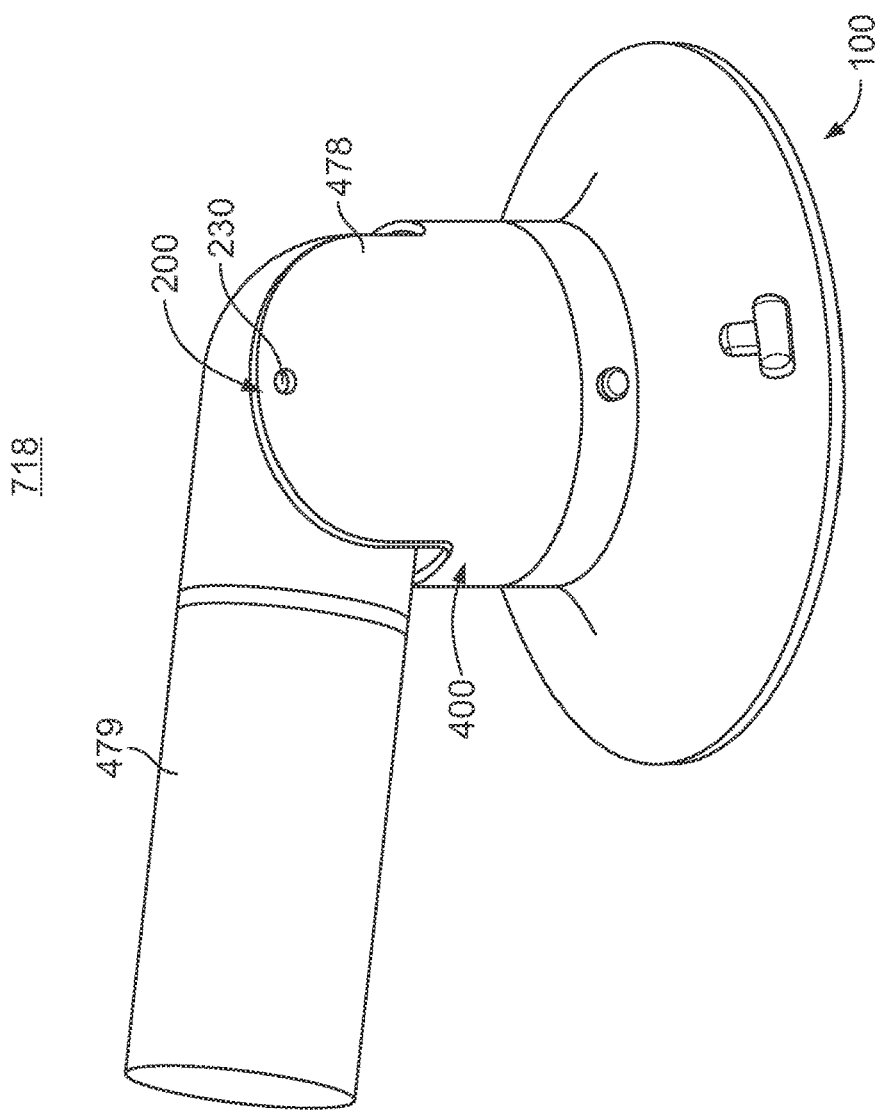
FIG. 19 illustrates another mounting assembly according to the invention.

FIG. 19 illustrates a mounting assembly 718 according to the invention. A support element 400 in the form of a swivel mount 478 is connected to housing 202 of mounting system 100. A rocker mount 479 is attached to the swivel mount 478 via a pin 230.

This mounting assembly 718, otherwise referred to as "rod rocker", is an improvement over current gimbal mounts. A gimbal mount is a device attached to a fighting chair for insertion of a rod when fighting a fish, and allows the rod to swivel in multiple directions following the movement of the fish. The rocker mount 479 allows a rod to rock in multiple directions while the swivel mount 478 allows the rod to rotate in a full circle, or 360 degrees, without the need for the fighting chair. Additionally, a rod can be placed within the swivel mount 478, thereby eliminating the need for the rocker mount 479. The mounting assembly 718 can then be adhered to the surface of a water vessel and a fishing rod accessory can be placed in the rod rocker.

Figure 20:
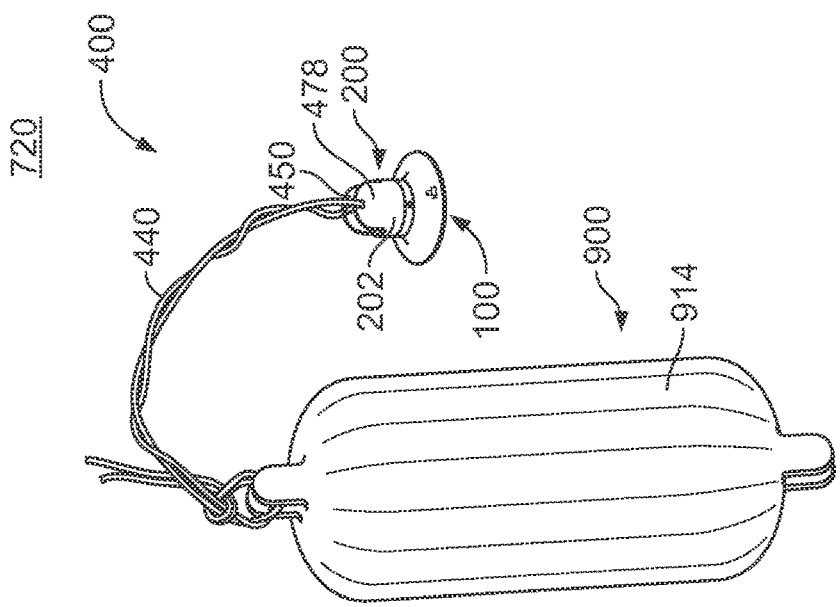
FIG. 20 illustrates another mounting assembly according to the invention.

FIG. 20 illustrates a mounting assembly 720 using a swivel mount 478 as well as a rope 440 as described in reference to FIG. 3D. Swivel mount 478 snap fits to housing 202 of mounting system 100 and rope 440 connects to swivel mount 478. This mounting assembly 720 allows any component 900 to be secured to rope 440, here, a buoy 914.

Figure 21:
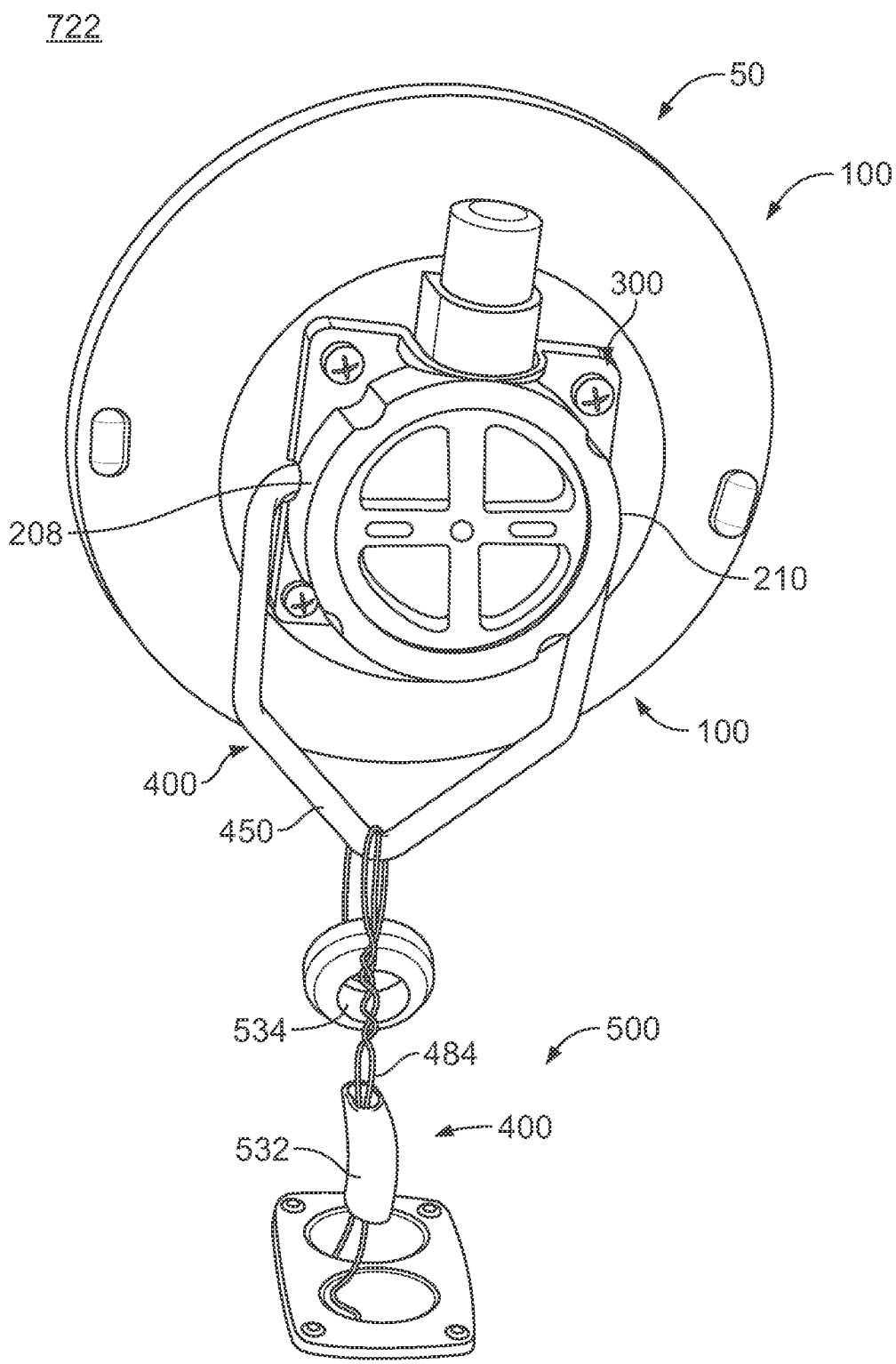
FIG. 21 illustrates another mounting assembly according to the invention.
Figure 22:
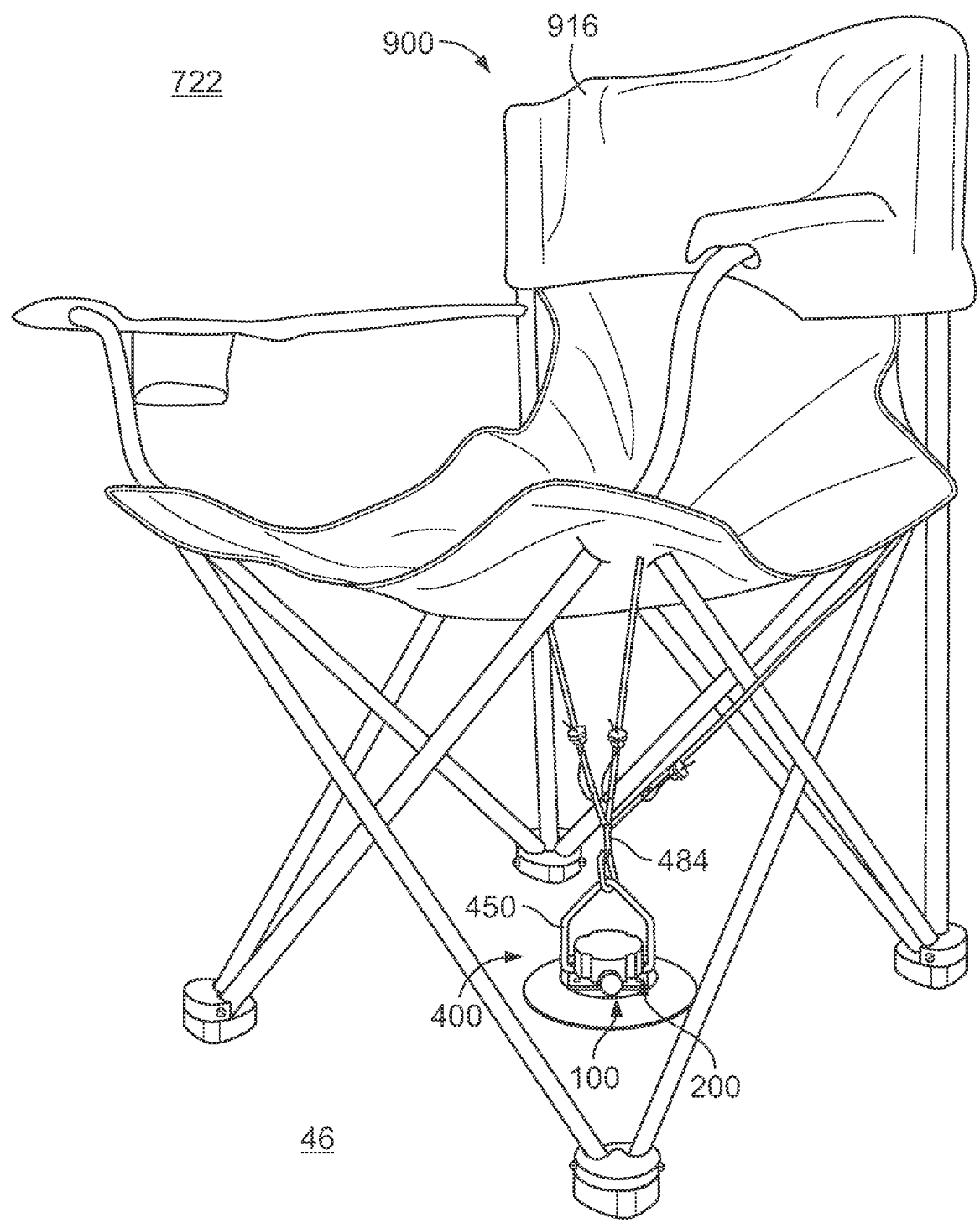
FIG. 22 illustrates another mounting assembly according to the invention.

FIG. 21 illustrates a mounting assembly 722 with a plurality of support elements 400 connected to mounting system 100 as illustrated in FIG. 2A. More specifically, handle 450 shown in FIG. 3E snap fits to first side 208 and second side 210 of housing 202. Cable 484 connects to handle 450. Cable 484 includes connecting elements 500 in the form of a nut and bolt cable lock 532, and swivel snap 534. Cable 484 can be adjusted to any desirable length. This mounting assembly 722 can be used to secure accessories 900 such as folding chairs to the deck of a boat, as well as buckets or bait coolers. Cable 484 can be secured, for example, from under a chair or bucket handle to under the gunnels to lock down a component 900 that would not normally be lockable. Likewise cable 484 keeps a vacuum device 50 in position in the event the pad 110 disengages from mounting surface. FIG. 22 illustrates the mounting assembly 722 of FIG. 21 with a folding chair 916. As shown, mounting system 100 mounts to surface 46. Handle 450 allows cable 484 to connect to the chair 916 in order to keep the chair positioned, for example, while a fisherman is fighting a fish.

Figure 23:
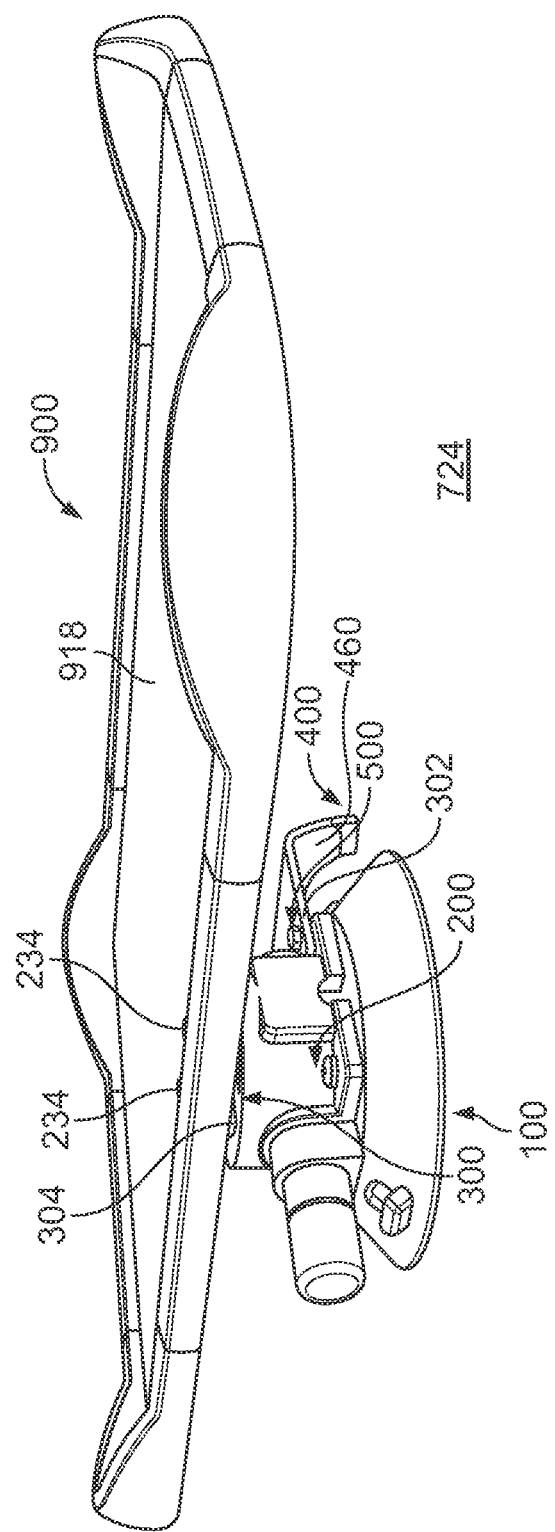
FIG. 23 illustrates another mounting assembly according to the invention.

FIG. 23 illustrates a mounting assembly 724 that includes the mounting system 100 as described in reference to FIG. 2A and the support element 400 describes as a buttress 460 of FIG. 3H. Bait tray 918 connects to slot 304 of housing 202 via hardware 234. Buttress 460 helps bear the load of the tray 918 and further alleviates stress on the mounting assembly 724 as further described in reference to FIGS. 4A and 4B.

Although a horizontal mount is shown in FIG. 23, it is contemplated that the mounting assembly 724 can be mounted vertically. A support element 400 such as an L-bracket shown in FIG. 3G allows the mounting assembly 724 to be secured to a sidewall of a water vessel while allowing the tray 918 to rest on a surface of a water vessel, for example a gunwale.

Figure 24:
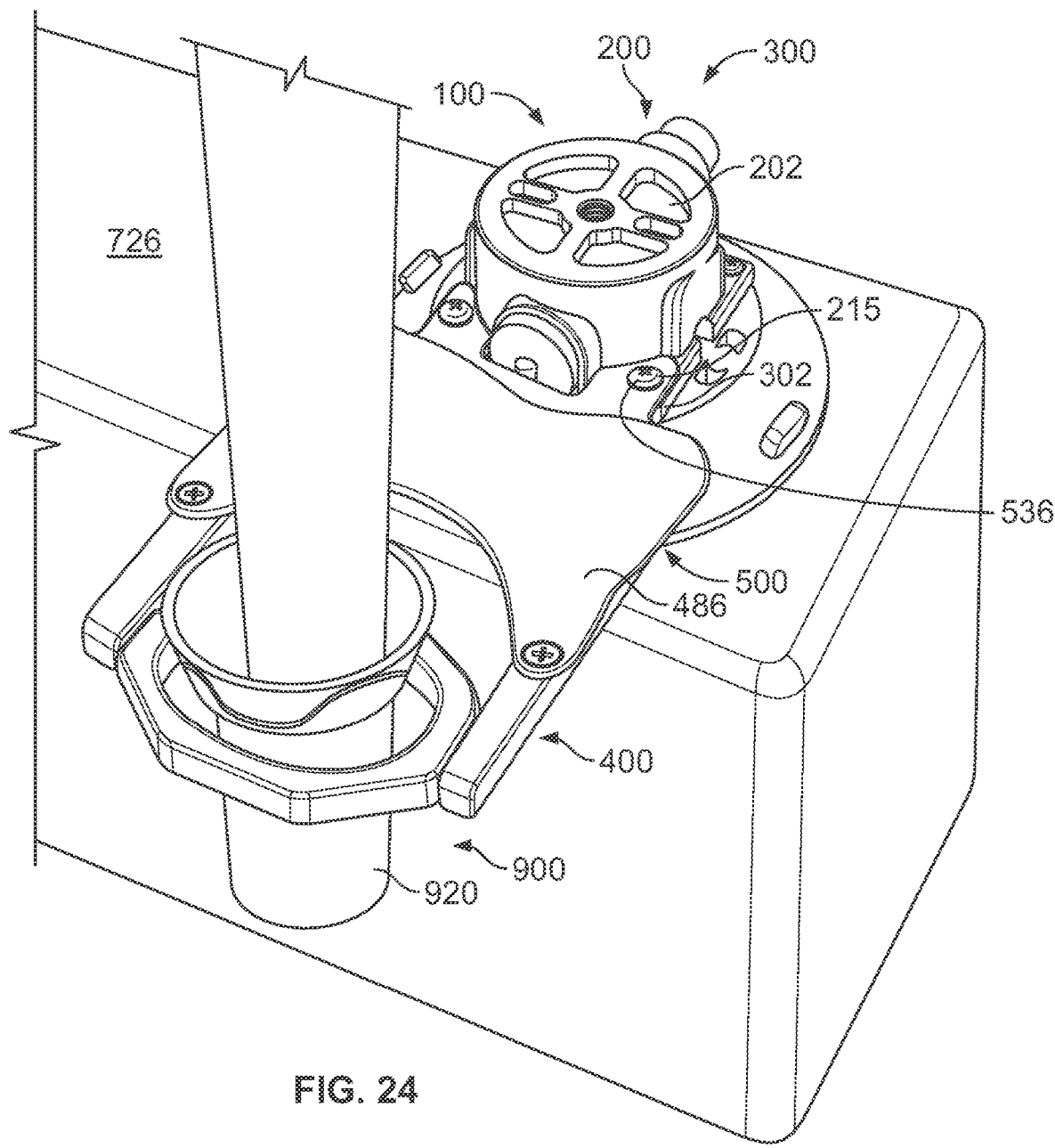
FIG. 24 illustrates another mounting assembly according to the invention.

FIG. 24 illustrates a mounting assembly 726 comprising a support element 400 in the form of a bracket 486. Bracket 486 includes connecting elements 500 in the form of attachment apertures 536 used for securement to housing apertures 302 of housing 202 via hardware 215. Gimbal 920 is secured to bracket 486 and allowed to tilt freely in any direction. This mounting assembly 726 can be attached to any surface of a water vessel as well as to another accessory 900, such as a fighting chair.

Figure 25:
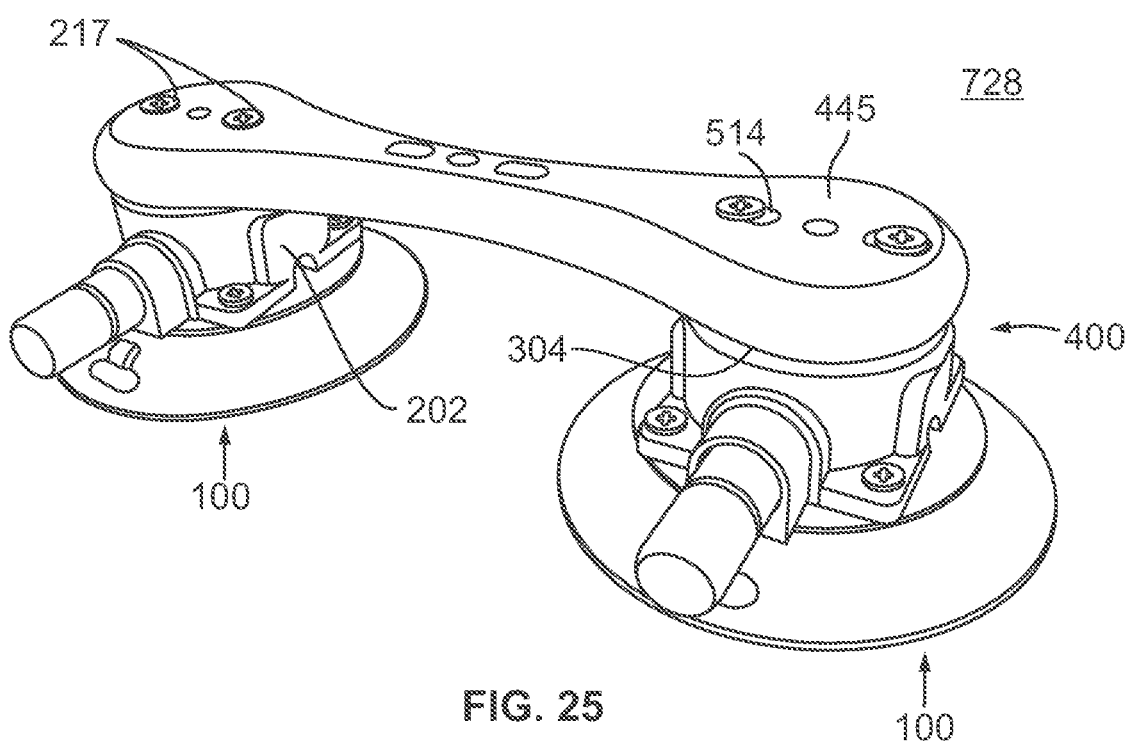
FIG. 25 illustrates another mounting assembly according to the invention.

FIG. 25 illustrates a mounting assembly 728 including two assemblies 100 as described in reference to FIG. 2A and a support element 400 as described in reference to FIG. 3F. Beam 445 is attached to housing 202 of the mounting system 100, wherein hardware 217 secures slot 304 and beam openings 514. Beam 445 can be used as a handle for a person to grasp or to attach various components 900.

Figure 26:
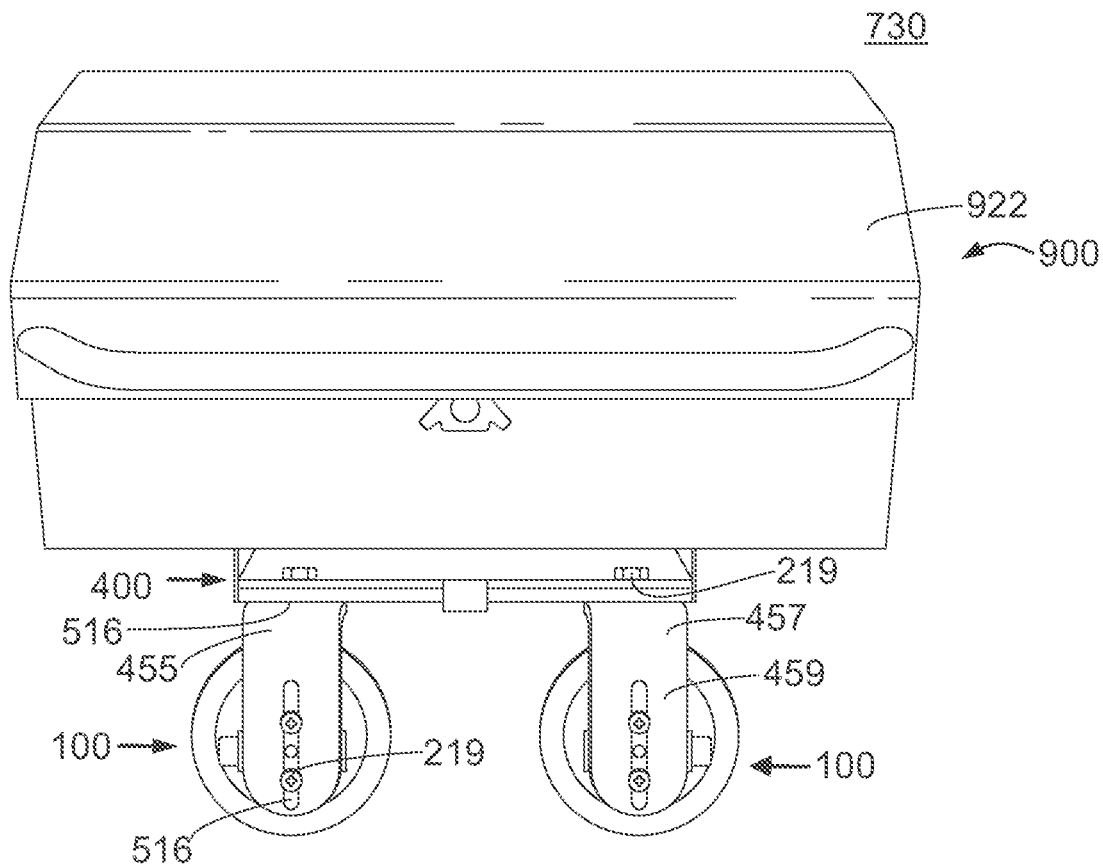
FIG. 26 illustrates another mounting assembly according to the invention.

FIG. 26 illustrates a mounting assembly 730 including two assemblies 100 as described in reference to FIG. 2A and support elements 400 as described in reference to FIG. 3G to secure a grill 922 to a surface. A grill 922 connects with the horizontal structure 457 of two L-shaped braces 455 using hardware 219 through brace opening 516 of brace 455. The vertical structure 459 of the L-shaped brace 455 is attached to housing 202 of the mounting system 100. Hardware 219 also engages slot 304 of housing 202 with opening 516 of the vertical structure 459 of brace 455. This configuration using an L-shaped brace 455 as shown in FIG. 26 allows grill 922 to be positioned on a horizontal surface while assemblies 100 are adhered to a vertical surface.

Figure 27:
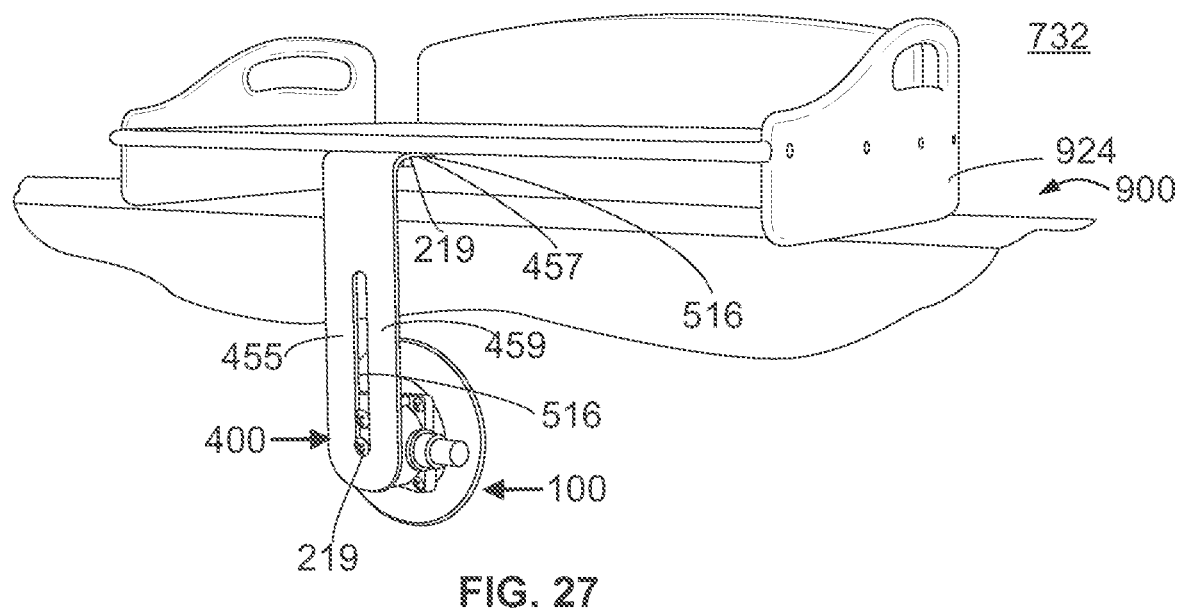
FIG. 27 illustrates another mounting assembly according to the invention.

FIG. 27 illustrates a mounting assembly 732 including one mounting system 100 as described in reference to FIG. 2A and support element 400 as described in reference to FIG. 3G to secure a fillet table 924 to a surface. Hardware 219 engage table 924 with the horizontal structure 457 of an L-shaped brace 455 via brace opening 516. The vertical structure 459 of the L-shaped brace 455 is attached to housing 202 of the mounting system 100. Hardware 219 also engage slot 304 of housing 202 with opening 516 of the vertical structure 459 of brace 455.

Figure 28A:
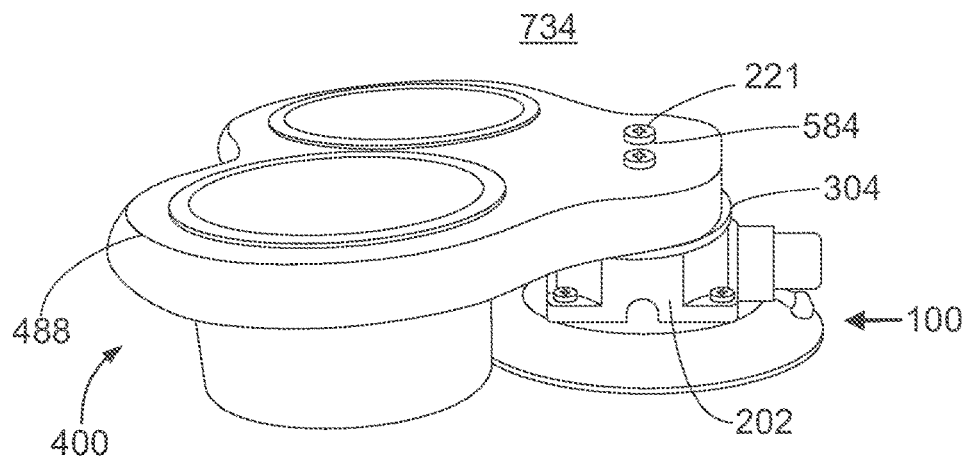
FIG. 28A illustrates another mounting assembly according to the invention.
Figure 28B:
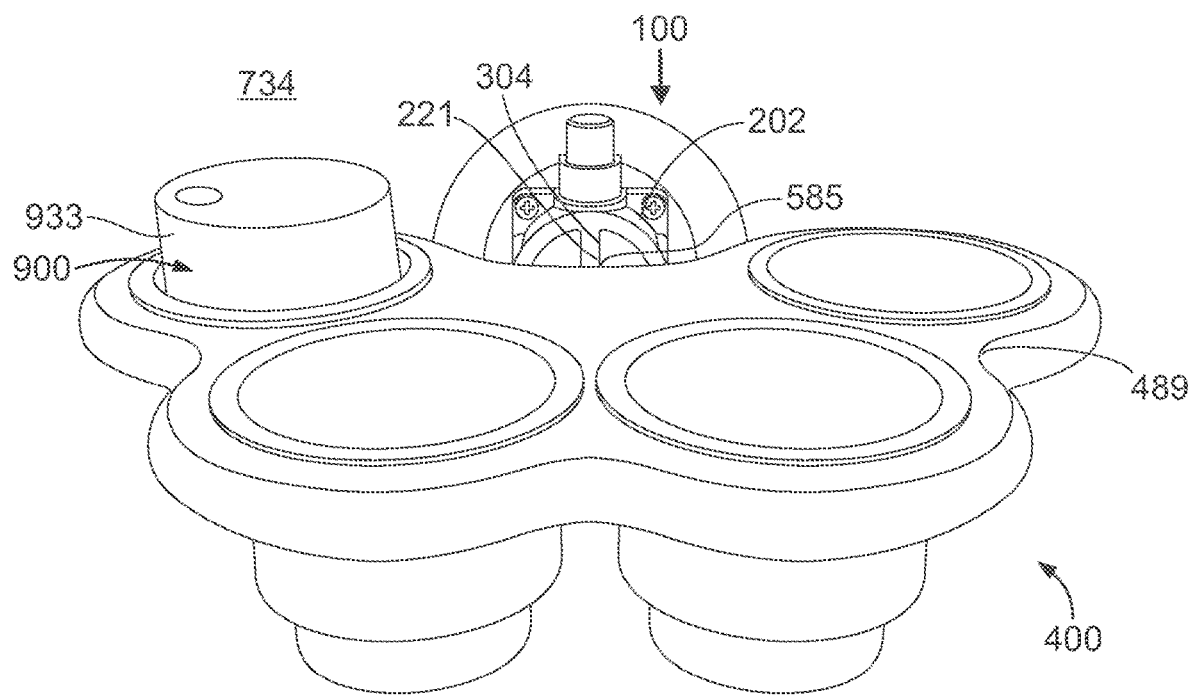
FIG. 28B illustrates another mounting assembly according to the invention.

Two different configurations of mounting assembly 734 are shown in FIG. 28A and FIG. 28B according to the invention. As shown by FIG. 28A, mounting assembly 734 is configured such that mounting system 100 is mounted onto a horizontal surface. FIG. 28B illustrates the mounting assembly 734 configured such that mounting system 100 is mounted onto a vertical surface. Thus, the mounting configuration used depends on the surface available for attachment of mounting system 100.

In reference to FIG. 28A, a support element 400 in the form of a cup holder 488. Cup holder 488 includes connecting elements 500 in the form of apertures 584 to engage with slot 304 of housing 202 using hardware 221. In this embodiment, cup holder 488 is positioned parallel to top side 204 of housing 202 of mounting system 100. In reference to FIG. 28B, a cup holder 489 includes connecting elements 500 in the form of apertures 585 to engage with mounting system 100 such that cup holder 489 is positioned perpendicular to top side 204 of housing 202. As shown, mounting assembly 734 holds a beverage container 933.

Figure 29:
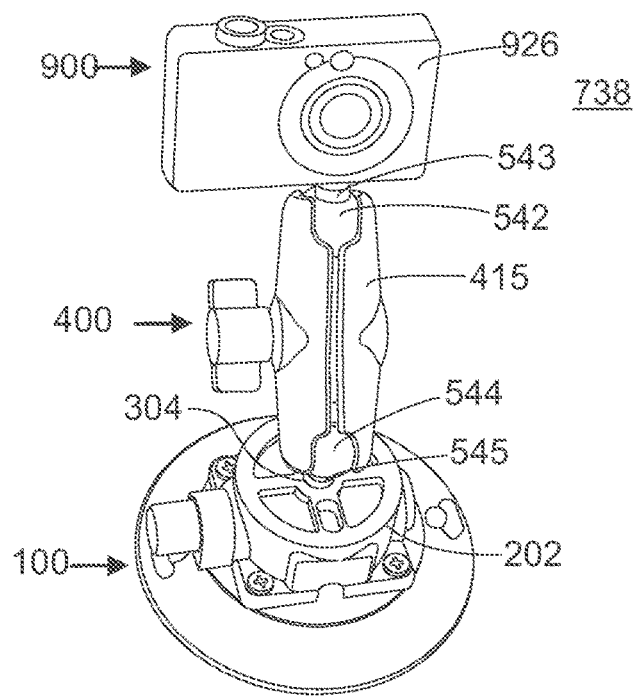
FIG. 29 illustrates another mounting assembly according to the invention.

FIG. 29 illustrates a mounting assembly 738 according to the invention. Mounting system 100, as described in reference to FIG. 2A, attaches to a support element 400 that further attaches to a component 900. As shown in FIG. 29, support element 400 is a ball-socket mount 415 including connecting elements of a first ball 542 with a first finger portion 543 and a second ball 544 including a second finger portion 545. First finger portion 543 connects to component 900, here a camera 926, and second finger portion 545 connects to attachment aperture 304 of housing 202.

Figure 30:
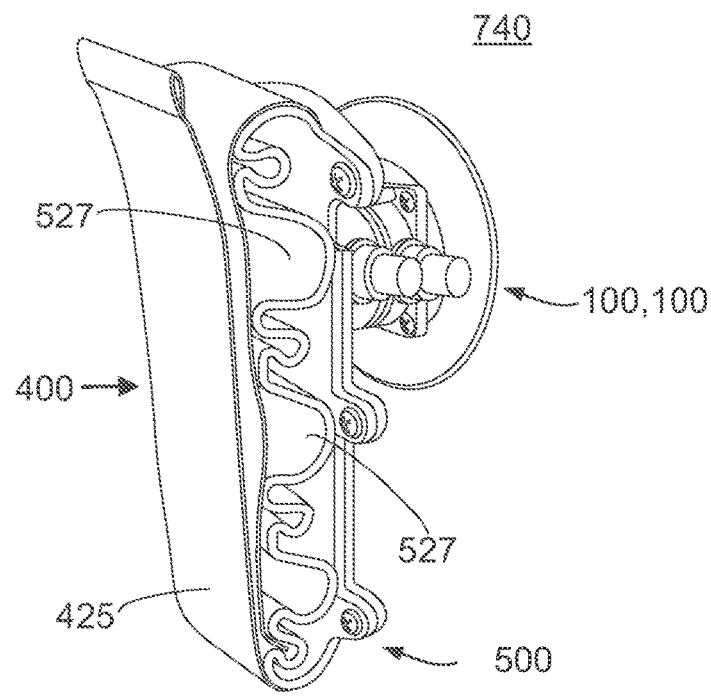
FIG. 30 illustrates another mounting assembly according to the invention.

FIG. 30 illustrates a mounting assembly 740 according to the invention. This embodiment illustrates a stacked configuration of two assemblies 100, 100. This embodiment includes a support element 400 in the form of a rod holder 425 with a connecting element 500 in the form of grasping elements 527 to horizontally secure components 900, for example, fishing poles, although it is contemplated this mounting assembly 740 may vertically secure components 900 as well.

Figure 31:
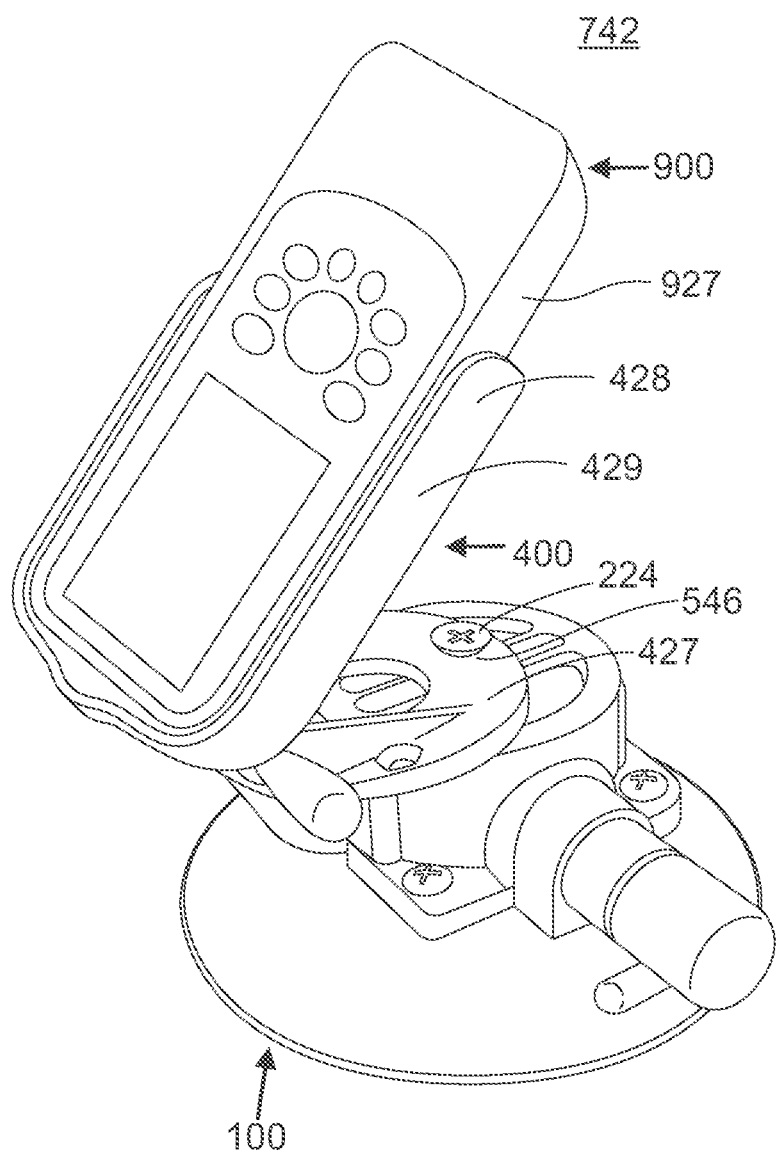
FIG. 31 illustrates another mounting assembly according to the invention.

FIG. 31 illustrates a mounting assembly 742 according to the invention. The mounting assembly 742 includes a support element 400 in the form of a pocket 429 with a base 427 and sleeve 428. The base 427 further includes connecting elements 500 in the form of an opening 546 for securement to mounting system 100, specifically hardware 224 secures pocket 429 to attachment aperture 304 of housing 202. Pocket 429 allows a component 900, here a Global Positioning System ("GPS") 927, to be positioned within sleeve 428.

Figure 32:
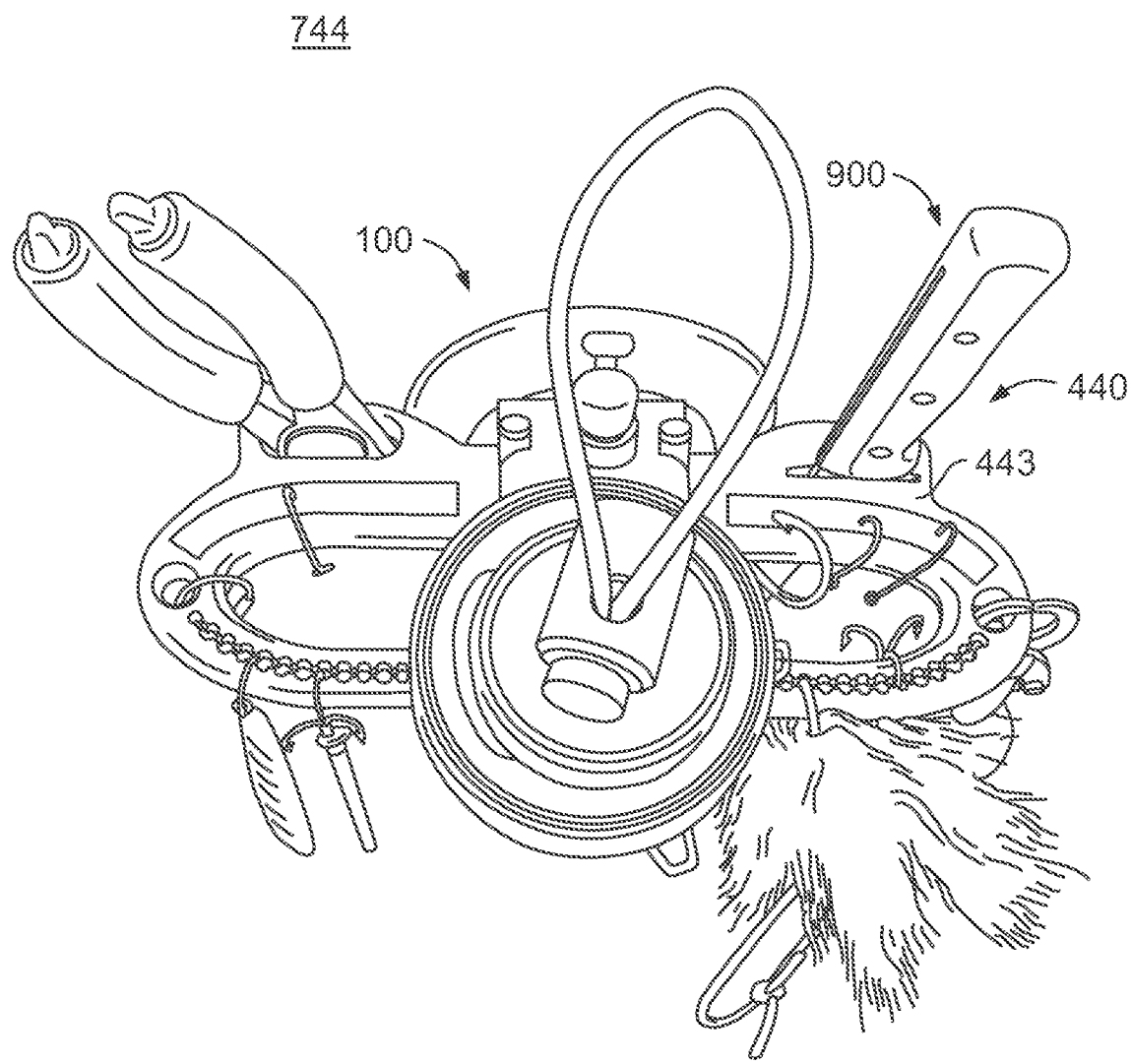
FIG. 32 illustrates another mounting assembly according to the invention.

FIG. 32 illustrates a mounting assembly 744 including one mounting system 100 as described in reference to FIG. 2A and a support element 400 shown as tackle bar 443. Tackle bar 443 includes a connecting element 500 for securement to mounting system 100. Tackle bar 443 allows attachment of various components 900 such as tackle equipment such as weights, knives, hooks, scissors, and leader rolls to name a few.

Figure 33:
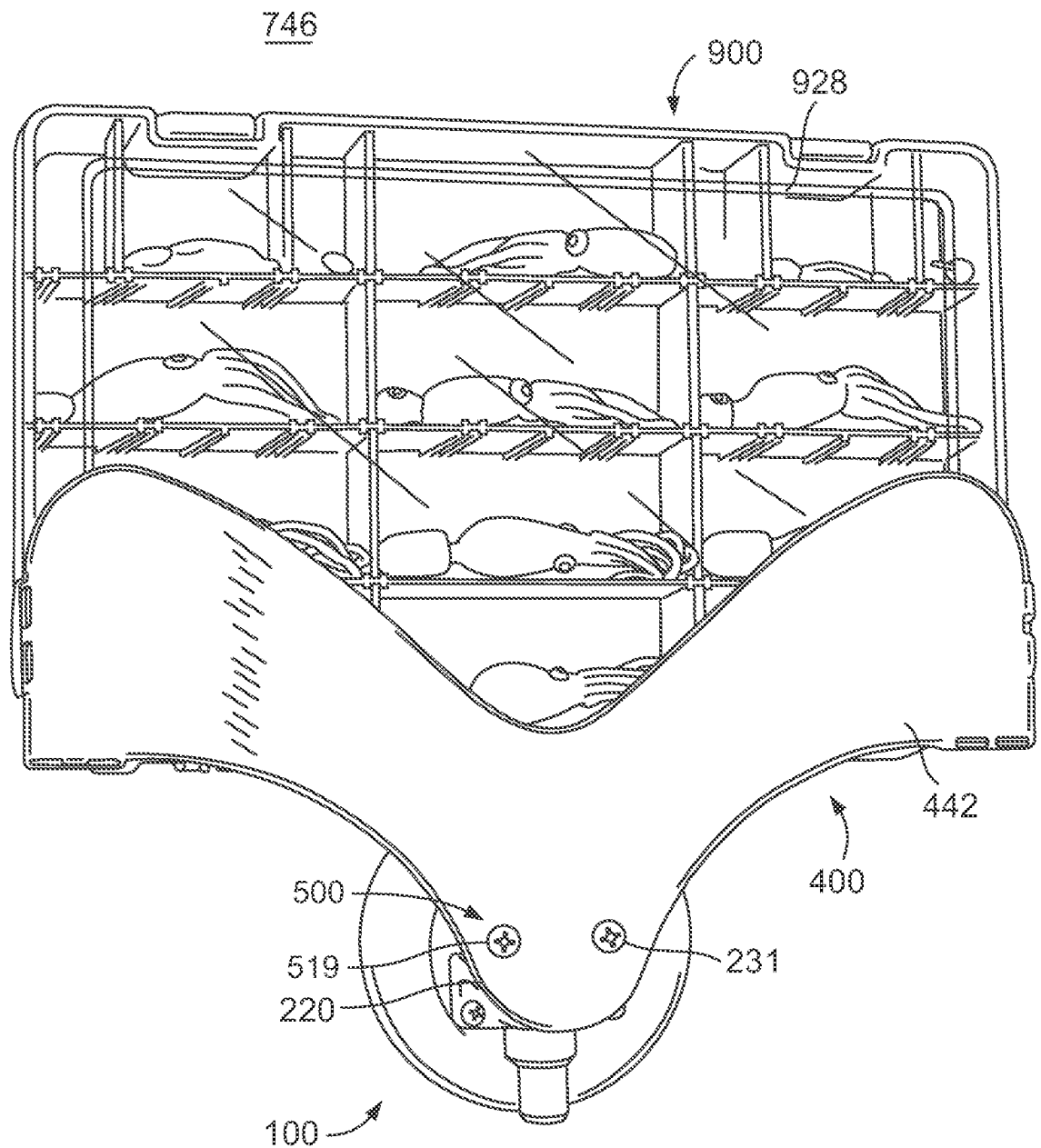
FIG. 33 illustrates another mounting assembly according to the invention.

FIG. 33 illustrates a mounting assembly 746 including one mounting system 100 as described in reference to FIG. 2A and support element 400 as described in reference to FIG. 3J to secure a tackle box 928 to a surface. Hardware 231 engage the V-shaped brace 442 to mounting system 100, specifically hardware 231 engages brace apertures 519 with slot 304 of housing 202. A tackle box 928 engages with V-shaped brace 442 in a snap-fit configuration.

Figure 34:
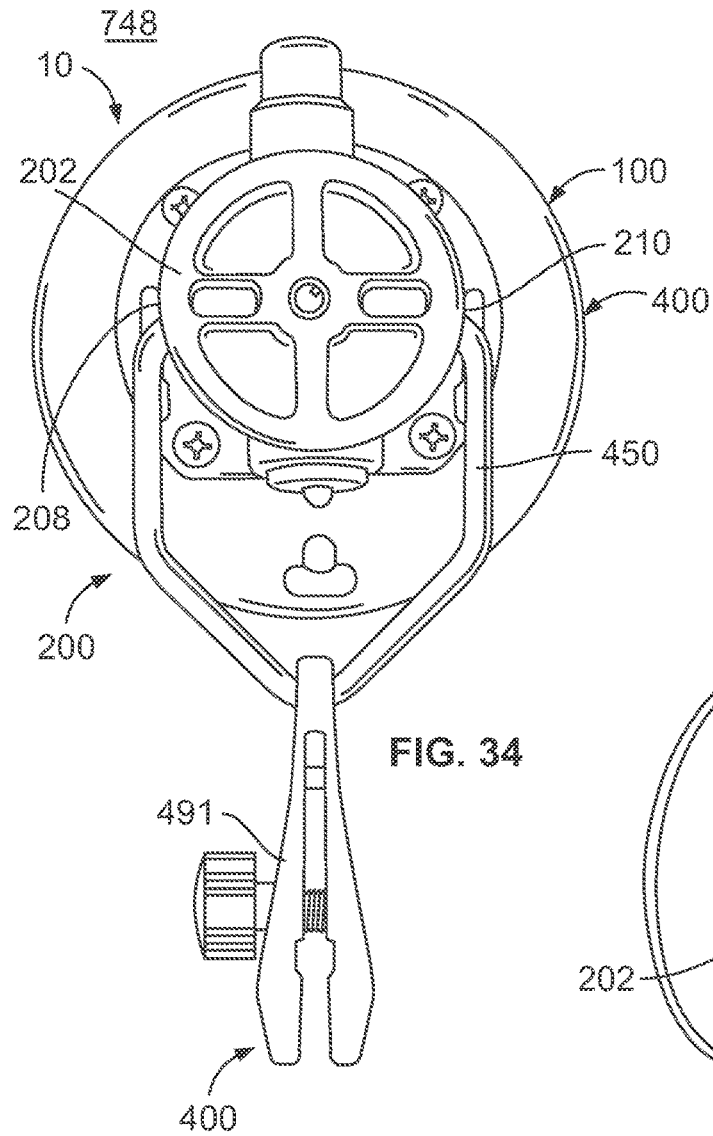
FIG. 34 illustrates another mounting assembly according to the invention.

FIG. 34 illustrates a mounting assembly 748 including one mounting system 100 as described in reference to FIG. 2A. Handle 450 shown in FIG. 3E snap fits to first side 208 and second side 210 of housing 202. Another support element 400 showed as a tarp clip 491 attaches to handle 450. Tarp clip 491 allows for attachment of an accessory 900 such as a tarp.

Figure 35:
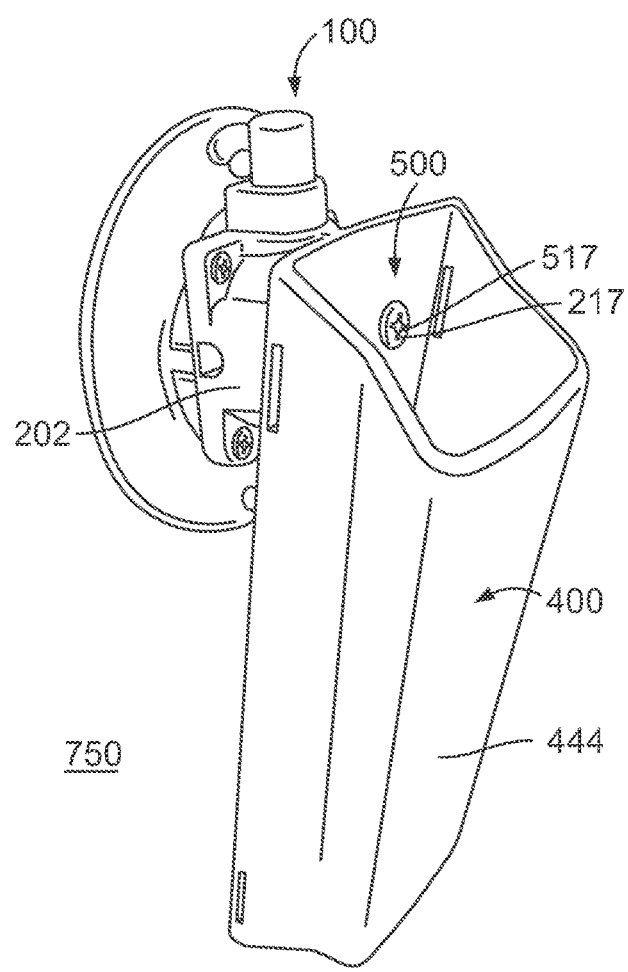
FIG. 35 illustrates another mounting assembly according to the invention.

FIG. 35 illustrates a mounting assembly 750 according to the invention. The mounting assembly 750 includes a support element 400 as a handle holder 444. Handle holder 444 may receive a variety of components 900, for example, a winch handle. Handle holder 444 includes connecting elements 500 in the form of hardware openings 517. Hardware 217 secures the holder 444 to the mounting system 100.

Figure 36:
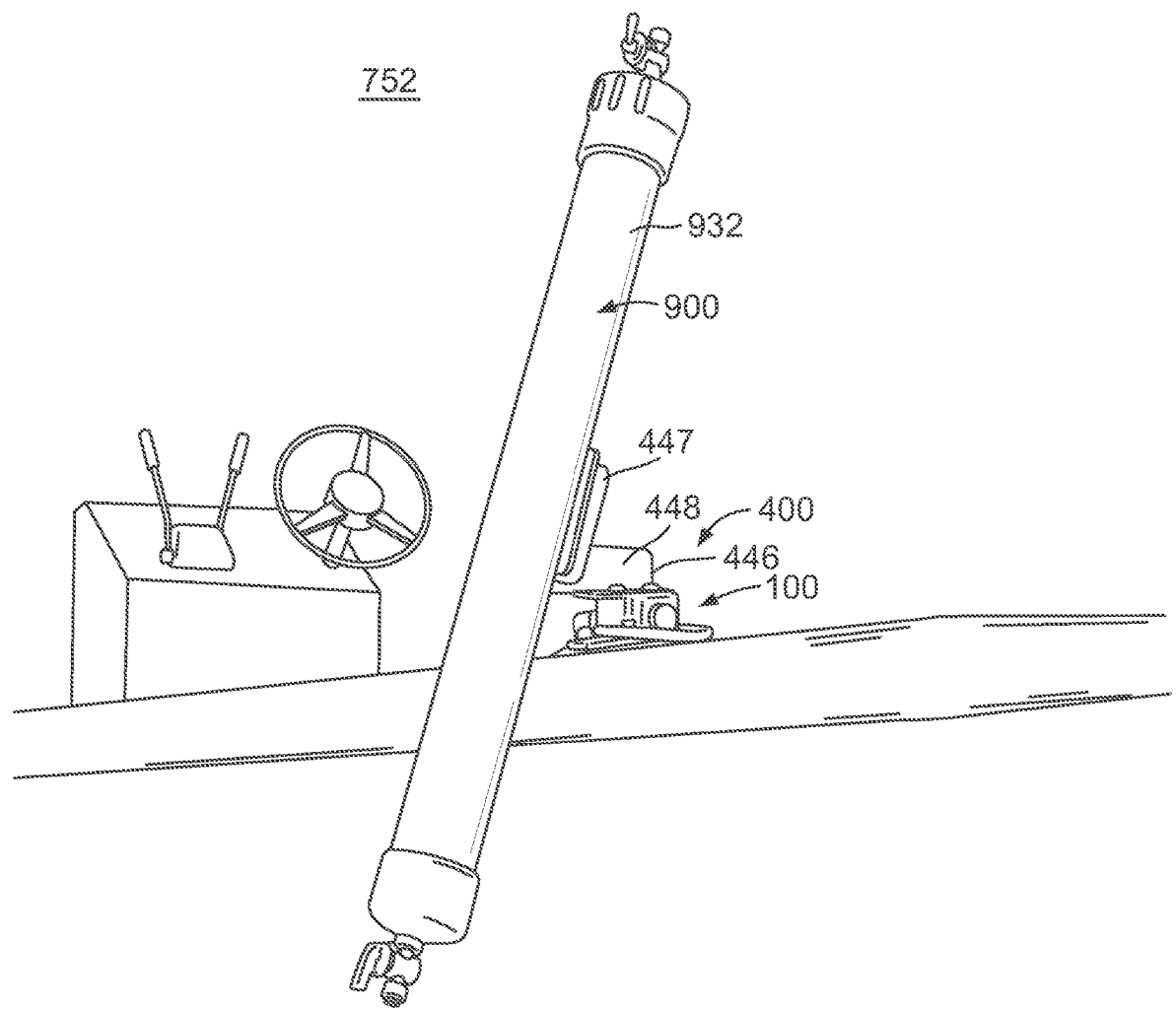
FIG. 36 illustrates another mounting assembly according to the invention.

FIG. 36 illustrates a mounting assembly 752 according to the invention. Mounting system 100, as described in reference to FIG. 2A, attaches to a support element 400 as described in reference to FIG. 3K. Support element 400 further attaches to a component 900. As specifically shown in FIG. 36, support element 400 is a clamp 446 including a moveable element 447 and a stationary element 448. Moveable element 447 connects to component 900, here a chum stick 932, and stationary element 448 includes connecting elements 500 that connect to mounting system 100.

Figure 37:
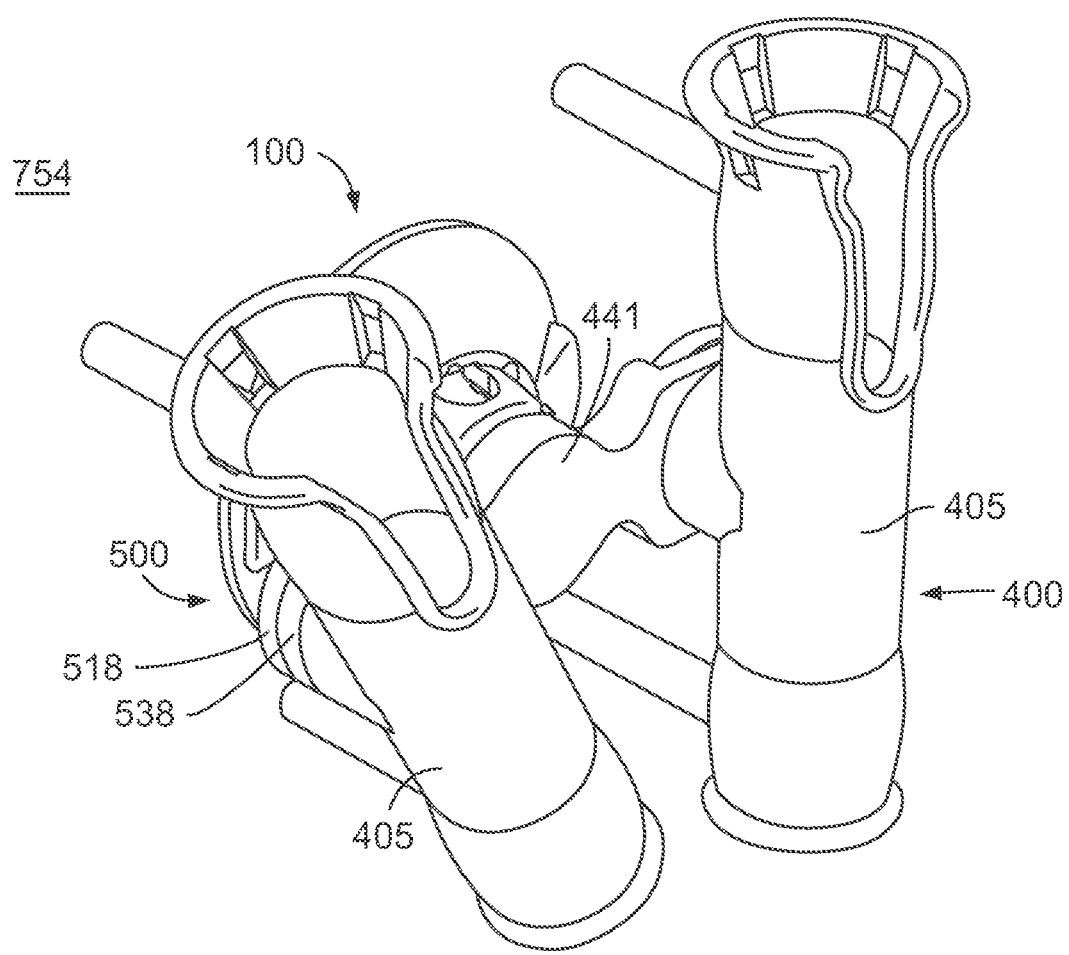
FIG. 37 illustrates another mounting assembly according to the invention.

FIG. 37 illustrates a mounting assembly 754 including one mounting system 100 as described in reference to FIG. 2A and support elements 400 as described in reference to FIG. 3I and FIG. 3L. Support elements 400 of the mounting assembly 754 include rod frame 441 and rod receptacle 405. Rod frame 441 includes connecting elements 500 as an attachment portion 518 positioned on opposite ends of the frame 441. Rod receptacle 405 includes an attachment protrusion 538. The rod frame 441 connects to mounting system 100. The attachment protrusions 538 of rod receptacle 405 engage with the attachment portions 518 of the frame 441.

Figure 38A:
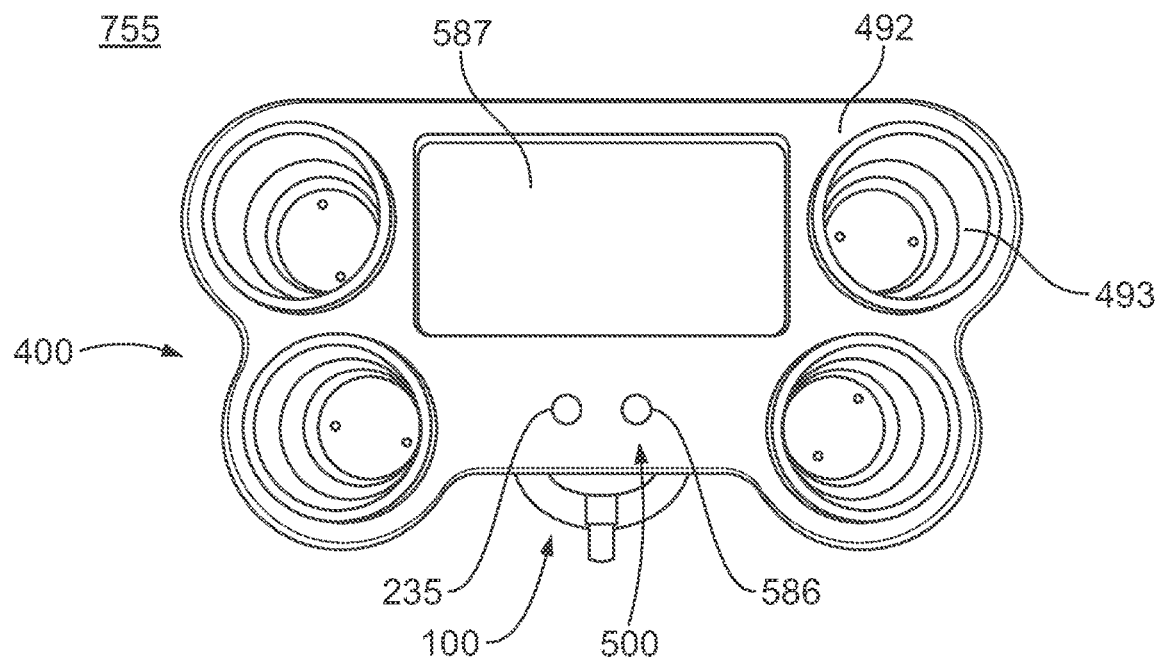
FIG. 38A illustrates another mounting assembly according to the invention.
Figure 38B:
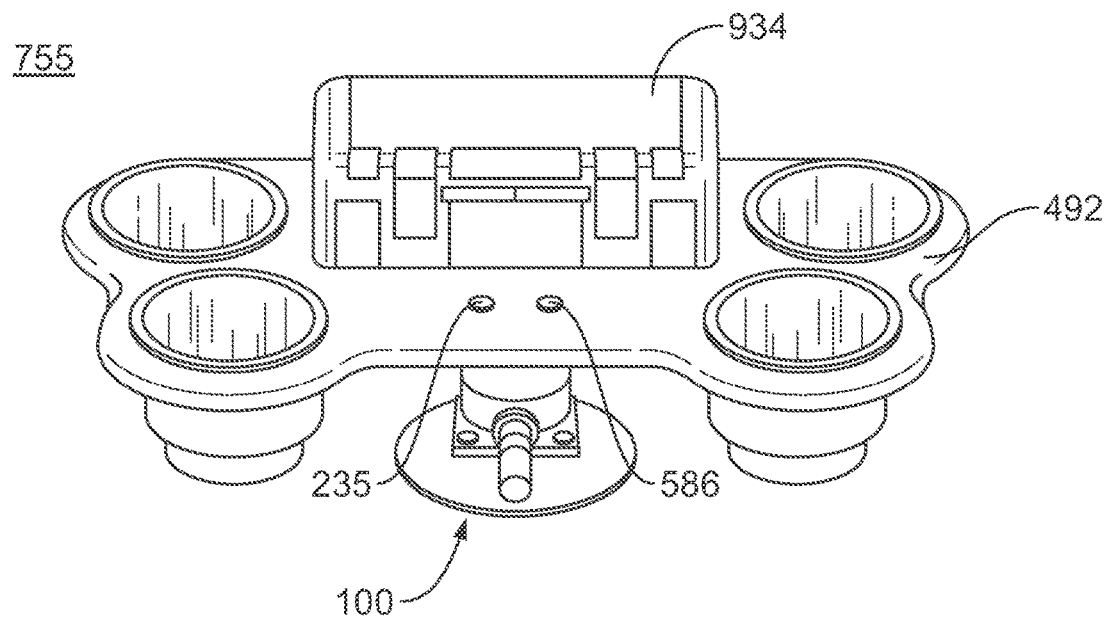
FIG. 38B illustrates another mounting assembly according to the invention.

FIG. 38A illustrates a mounting assembly 755 including a support element 400 in the form of a cup holder 492. Cup holder 492 includes connecting elements 500 in the form of apertures 586 to engage with slot 304 of housing 202 using hardware 235. Cup holder 492 also includes four compartments 493 for holding beverage containers as well as a cutout 587. As shown in FIG. 38B, cutout 587 is used to secure a dry box 934.

Figure 39:
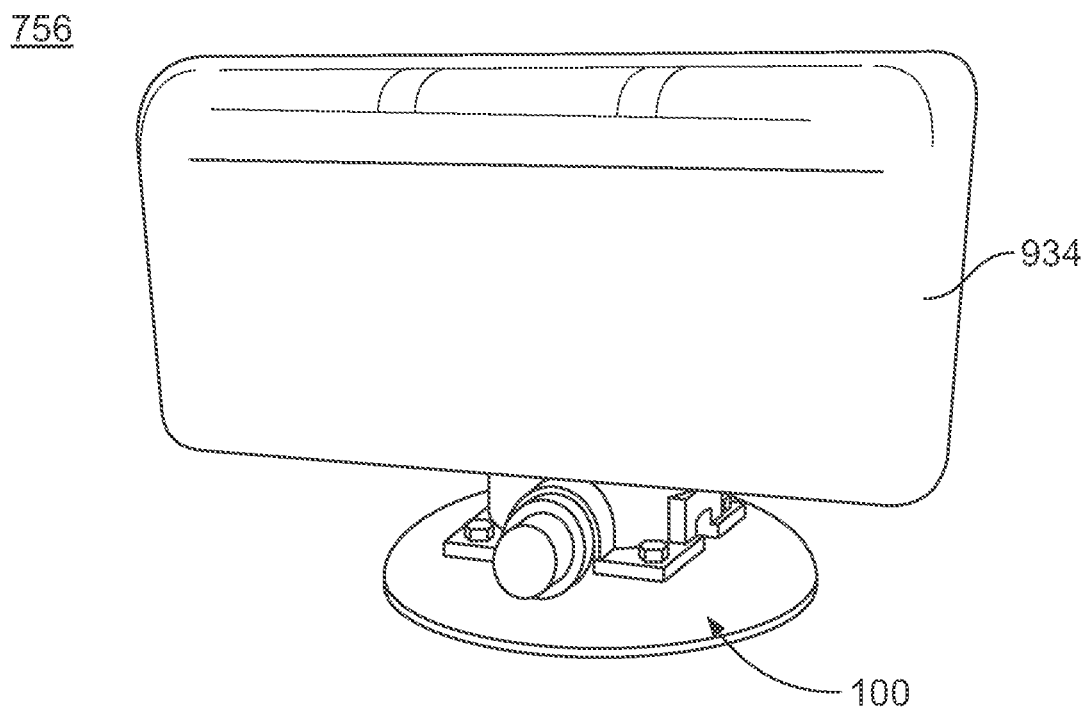
FIG. 39 illustrates another mounting assembly according to the invention.

FIG. 39 illustrates a mounting assembly 756 illustrating the dry box 934 directly secured to mounting system 100. Dry box 934 is attached to the mounting system 100 using one or more attachment elements 300 on the housing 200, including for example, apertures, holes, slots, and/or pockets.

Figure 40:
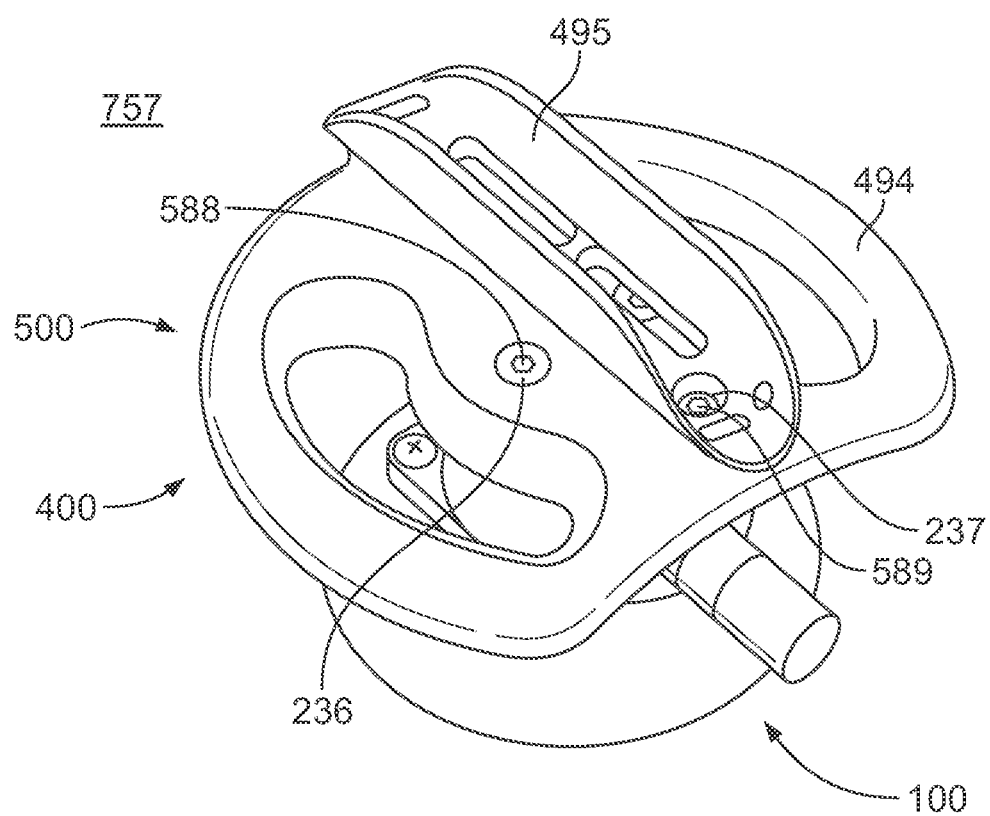
FIG. 40 illustrates another mounting assembly according to the invention.

FIG. 40 illustrates another mounting assembly 757 according to the invention. According to that shown in FIG. 40, assembly 757 includes a mounting system 100 and two support elements 400—a first support element connected to the mounting system and the second support element connected to the first support element. Each support element 400 further includes one or more connecting elements 500. More specifically, carry/grip handle 494 includes hole 588 for hardware 236 used to connect the handle 494 to one or more attachment elements 300 of the housing 200 of mounting system 100. Similarly, a paddle clip 495 for a paddle board paddle 935 (not shown) includes hole 589 for hardware 237 used to connect the clip 495 to handle 494.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A mounting system, comprising: a vacuum device including a vacuum pad and a vacuum pump through which a vacuum may be developed between the vacuum pad and the mounting surface, the vacuum pad including a top face with one or more connection elements and a side face with a release tab to assist in releasing the vacuum between the vacuum pad and the mounting surface, the vacuum pump including a plunger with an indicator, wherein the indicator conveys the securement level of the vacuum between the vacuum pad and the mounting surface, a housing centrally located on the vacuum pad and enclosing a majority of the vacuum pump, the housing including a top side, a bottom side, a first side, a second side, a third side, and a pump side, wherein the top side includes one or more attachment elements, a fillet table attached to the one or more attachment elements, the housing integrated with the vacuum pad, wherein one or more housing apertures of the housing is connected to each of the one or more connection elements of the vacuum pad.

2. The mounting system according to claim 1, wherein the fillet table is positioned perpendicular to the top side of the housing.

3. The mounting system according to claim 1, wherein the housing is square-shaped.

4. The mounting system according to claim 1, further comprising a brace.

5. The mounting system according to claim 4, wherein the brace is L-shaped comprising a vertical structure and a horizontal structure.

6. The mounting system according to claim 5, wherein the fillet table is connected to the horizontal structure of the L-shaped brace.

7. The mounting system according to claim 5, wherein the housing is connected to the vertical structure of the L-shaped brace.

* * * * *